US010289875B2

(12) United States Patent
Singh et al.

(10) Patent No.: US 10,289,875 B2
(45) Date of Patent: May 14, 2019

(54) EMBEDDING DATA ON OBJECTS USING SURFACE MODULATION

(71) Applicant: Portland State University, Portland, OR (US)

(72) Inventors: Suresh Singh, Portland, OR (US); Farnoosh Moshirfatemi, Portland, OR (US)

(73) Assignee: Portland State University, Portland, OR (US)

( * ) Notice: Subject to any disclaimer, the term of this patent is extended or adjusted under 35 U.S.C. 154(b) by 0 days.

(21) Appl. No.: 15/746,275

(22) PCT Filed: Jul. 22, 2016

(86) PCT No.: PCT/US2016/043695
§ 371 (c)(1),
(2) Date: Jan. 19, 2018

(87) PCT Pub. No.: WO2017/023586
PCT Pub. Date: Feb. 9, 2017

(65) Prior Publication Data
US 2018/0211070 A1    Jul. 26, 2018

Related U.S. Application Data

(60) Provisional application No. 62/199,787, filed on Jul. 31, 2015.

(51) Int. Cl.
*G06K 1/12* (2006.01)
*G06K 19/06* (2006.01)
(Continued)

(52) U.S. Cl.
CPC .............. *G06K 1/121* (2013.01); *B33Y 50/00* (2014.12); *G06F 17/141* (2013.01);
(Continued)

(58) Field of Classification Search
CPC .... G06K 1/121; G06K 7/10; G06K 19/06159; G06F 17/147
(Continued)

(56) References Cited

U.S. PATENT DOCUMENTS 6,369,879 B1    4/2002  Pedersen
6,415,056 B1    7/2002  Boon
(Continued)

OTHER PUBLICATIONS

Balbin et al., "Phase-Encoded Chipless RFID Transponder for Large-Scale Low-Cost Applications," IEEE Microwave and Wireless Components Letters, vol. 19, No. 8, Aug. 2009, pp. 509-511.
(Continued)

*Primary Examiner* — Toan C Ly
(74) *Attorney, Agent, or Firm* — Klarquist Sparkman, LLP

(57) ABSTRACT

Methods and apparatus are disclosed for embedding static information (such as serial numbers, etc.) on objects by modifying their exterior shape slightly, dubbed surface modulation. Data is embedded when the object is created and can then be read using readers with the appropriate resolution. According to one example of the disclosed technology, a method of embedding data expressed as a binary sequence onto an object surface includes establishing a coordinate system over an object surface, computing a transform of the coordinate system to a frequency domain, mapping the binary sequence to an integer value, replacing the highest frequency coefficient of the transform with the integer value, computing an inverse of the transform, producing a vector expressed in the coordinate system, and fabricating at least a portion of the object surface according to the vector.

24 Claims, 32 Drawing Sheets

(51) Int. Cl.
G06F 17/14 (2006.01)
G06K 7/10 (2006.01)
B33Y 50/00 (2015.01)
B33Y 10/00 (2015.01)
B33Y 80/00 (2015.01)

(52) U.S. Cl.
CPC ............ *G06F 17/147* (2013.01); *G06K 1/12* (2013.01); *G06K 7/10* (2013.01); *G06K 7/10712* (2013.01); *G06K 19/06* (2013.01); *G06K 19/06159* (2013.01); *B33Y 10/00* (2014.12); *B33Y 80/00* (2014.12); *G06K 2019/06271* (2013.01)

(58) Field of Classification Search
USPC ........................................ 235/376, 490, 494
See application file for complete search history.

(56) References Cited

U.S. PATENT DOCUMENTS

| | | | |
|---|---|---|---|
| 7,600,688 | B2 | 10/2009 | Lapstun et al. |
| 2006/0151621 | A1 | 7/2006 | Ladas et al. |
| 2011/0142294 | A1* | 6/2011 | Sagan .................. G07D 7/2033 382/112 |
| 2012/0092461 | A1 | 4/2012 | Fisker et al. |

OTHER PUBLICATIONS

Chou et al., "Technologies for 3D Model Watermarking: A Survey," IJCSNS International Journal of Computer Science and Network Security, vol. 7, No. 2, Feb. 2007, pp. 328-334.
Hamdi et al., "New Approach for Chipless and Low Cost Identification Tag in the THz Frequency Domain," 2012 IEEE International Conference on RFID-Technologies and Application, Nov. 2012, pp. 24-28.
Harte et al., "Watermarking 3D Models," 2002 International Conference on Image Processing, Sep. 2002, pp. 661-664.
Hartmann, "A Global SAW ID Tag with Large Data Capacity," 2002 IEEE Ultrasonics Symposium, Oct. 2002, pp. 65-69.
Hosam et al., "Public Watermarking Scheme for 3D Laser Scanned Archeological Models," 2012 IEEE Symposium on Computers and Communications, Jul. 2012, pp. 382-389.
Houni et al., "One-dimensional barcode reading: an information theoretic approach," Applied Optics, vol. 47, Issue 8, 2008, pp. 1025-1036.
Hsieh et al., "Hiding Digital Watermarks Using Multiresolution Wavelet Transform," IEEE Transactions on Industrial Electronics, vol. 48, No. 5, Oct. 2001, pp. 875-882.
International Search Report and Written Opinion for PCT/US2016/043695, dated Nov. 2, 2016, 14 pages.
Jalaly et. al., "RF Barcodes using Multiple Frequency Bands," IEEE MTT-S International Microwave Symposium Digest, Jul. 2005, pp. 139-142.
Li et al., "Bandwidth Dependence of CW Ranging to UJHF RFID Tags in Severe Multipath Environments," 2011 IEEE Conference on RFID, Apr. 2011, pp. 19-25.
Lin et al., "Fragile Watermarking for Authenticating 3-D Polygonal Meshes," IEEE Transactions on Multimedia, vol. 7, No. 6, Dec. 2005, pp. 997-1006.
Liu et al., "Ambient Backscatter: Wireless Communication Out of Thin Air," Proceedings of the ACM SIGCOMM 2013 conference on SIGCOMM, Aug. 2013, pp. 39-50.
Loo et al., "Digital Watermarking Using Complex Wavelets," 2000 International Conference on Image Processing, Sep. 2000, pp. 29-32.
Moshir et al., "Wireless Barcodes for Tagging Infrastructure," 20th Annual International Conference on Mobile Computing and Networking, Sep. 2014, pp. 103-114.
Mukherjee, "Chipless Radio Frequency Identification by Remote Measurement of Complex Impedance," 10th European Conference on Wireless Technology, Oct. 2007, pp. 249-252.
Ohbuchi et al., "Watermarking Three-Dimensional Polygonal Models Through Geometric and Topological Modifications," IEEE Journal on Selected Areas in Communications, vol. 16, No. 4, May 1998, pp. 551-560.
Perret et al., "THID, the next step of chipless RFID," 2013 IEEE International Conference on RFID, Apr.-May 2013, pp. 261-268.
Podilchuk et al., "Digital Watermarking: Algorithms and Applications," IEEE Signal Processing Magazine, Jul. 2001, pp. 33-46.
Praun et al., "Robust Mesh Watermarking," 26th Annual Conference on Computer Graphics and Interactive Techniques, Aug. 1999, pp. 49-57.
Preradovic et al., "Fully Printable Multi-Bit Chipless RFID Transponder on Flexible Laminate," APMC 2009 Microwave Conference, Dec. 2009, pp. 2371-2374.
Tedjini et al., "Chipless Tags for RF and THz Identification," 2010 4th European Conference on Antennas and Propagation, Apr. 2010, pp. 1-5.
Vena et al., "Chipless RFID Tag Using Hybrid Coding Technique," IEEE Transactions on Microwave Theory and Techniques, vol. 59, No. 12, Dec. 2011, pp. 3356-3364.
Vladišauskas et al., "Absorption of ultrasonic waves in air," ISSN 1392-2114 Ultragarsas, Nr.1(50), Feb. 2004, pp. 46-49.
Wang et al., "Three-Dimensional Meshes Watermarking: Review and Attack-Centric Investigation," IEEE Transactions on Multimedia, vol. 10, Issue 8, Dec. 2008, pp. 1-15.
Willis et al., InfraStructs: Fabricating Information Inside Physical Objects for Imaging in the Terahertz Region, ACM Transactions on Graphics, vol. 32, No. 1 4, Article 138, Jul. 2013, pp. 1-10.
Yaman et al., "Ultrasonic Pulse Velocity in Concrete Using Direct and Indirect Transmission," ACI Materials Journal, Nov.-Dec. 2001, pp. 450-457.
Yeo et al., "Watermarking 3D Objects for Verification," IEEE Computer Graphics and Applications, vol. 19, Issue 1, Jan./Feb. 1999, pp. 36-45.

* cited by examiner

2700

EMBEDDING DATA ON OBJECTS USING SURFACE MODULATION

CROSS REFERENCE TO RELATED APPLICATIONS

This is the U.S. National Stage of International Application No. PCT/US2016/043695, filed Jul. 22, 2016, which was published in English under PCT Article 21(2), which in turn claims the benefit of U.S. Provisional Application No. 62/199,787, filed Jul. 31, 2015. The provisional application is incorporated herein in its entirety.

ACKNOWLEDGMENT OF GOVERNMENT SUPPORT

This invention was made with government support under award number 1217994 awarded by the National Science Foundation. The government has certain rights in this invention.

SUMMARY

Apparatus, articles of manufacture, and methods are disclosed for embedding data expressed as a binary sequence onto an object surface, and for decoding such data that has been embedded on an object. In one example of the disclosed technology, a method includes establishing a coordinate system over an object surface, computing a discrete transform of the coordinate system to a frequency domain, mapping the binary sequence to an integer value, replacing one or more frequency coefficients of the transform with the integer value, computing an inverse of the transform, producing a vector expressed in the coordinate system, and fabricating at least a portion of the object surface according to the vector. In some examples, the coordinate system is one-dimensional or two-dimensional. In some examples, the computed transform includes a discrete cosine transform, a discrete wavelet transform, a discrete sine transform, a discrete Hartley transform, a Chirplet transform, a Hankel transform, a Chebyshev transform, or a Hadamard transform. In some examples, the fabricating comprises using a 3-D printer, a laser etcher, or an array of transducers connected to a mold. In some examples, the article of manufacture is a vehicle component, an integrated circuit, an integrated circuit package, a firearm, or another manufactured object.

In some examples of the disclosed technology, a method of decoding data stored on an object having an object surface includes scanning a surface of the object to determine a vector of surface measurements, computing a transform of the vector, producing a series of coefficients, scaling one or more frequency coefficients of the series of coefficients to produce an integer value, and mapping the integer value to a binary sequence. In some examples, the binary sequence is compared to a database in order to identify the object. In some examples, the transform is a discrete cosine transform or a discrete wavelet transform. In some examples, the scanning is performed using a laser or terahertz scanner.

In some examples, an apparatus includes a processor, memory, and one or more computer-readable storage media storing computer-readable instructions that when executed by a computer, cause the computer to perform any of the disclosed examples. In some examples, the apparatus includes scanning device operable to generate a vector of data by measuring the surface of an object. In some examples, the scanner is a laser scanner or a terahertz scanner.

To develop a systematic understanding of surface modulation, a formal model for discrete cosine transform (DCT) is disclosed. The formal model disclosed below describes the mathematical basis for operation of the disclosed technologies for embedding data on the surfaces of various objects, and reading such data from the object surfaces. This model also underlies computational technologies that can be configured to perform the disclosed methods of analysis. Computer systems configured to perform the disclosed methods, including those computer systems coupled to, and not coupled to, disclosed apparatus for embedding and reading back data from physical objects, can exhibit a number of tangible benefits in reading, analyzing, and embedding such data, including but not limited to: improved performance times, improved error rates, improved security, improved resilience to defects or damage, improved cost or speed of manufacture, amongst other benefits. Thus, examples of the disclosed technology are disclosed for improvements in the manufacture of objects, including vehicle components, integrated circuits and packages, firearms, or other physical, manufactured objects. Further, certain computer-implemented examples of the disclosed technology can improve the performance of the disclosed computer systems themselves, for example, by improved use of computational resources such as processor and memory resources, as well as improving the accuracy of embedding, reading, and analyzing such data on physical objects. Further, the capacity of data (e.g., number of bits per linear or areal inch) can be further improved by using certain disclosed examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures. Further, and trademarks are the property of their respective owners.

DETAILED DESCRIPTION

Introduction to the Disclosed Technology

Figure 1:
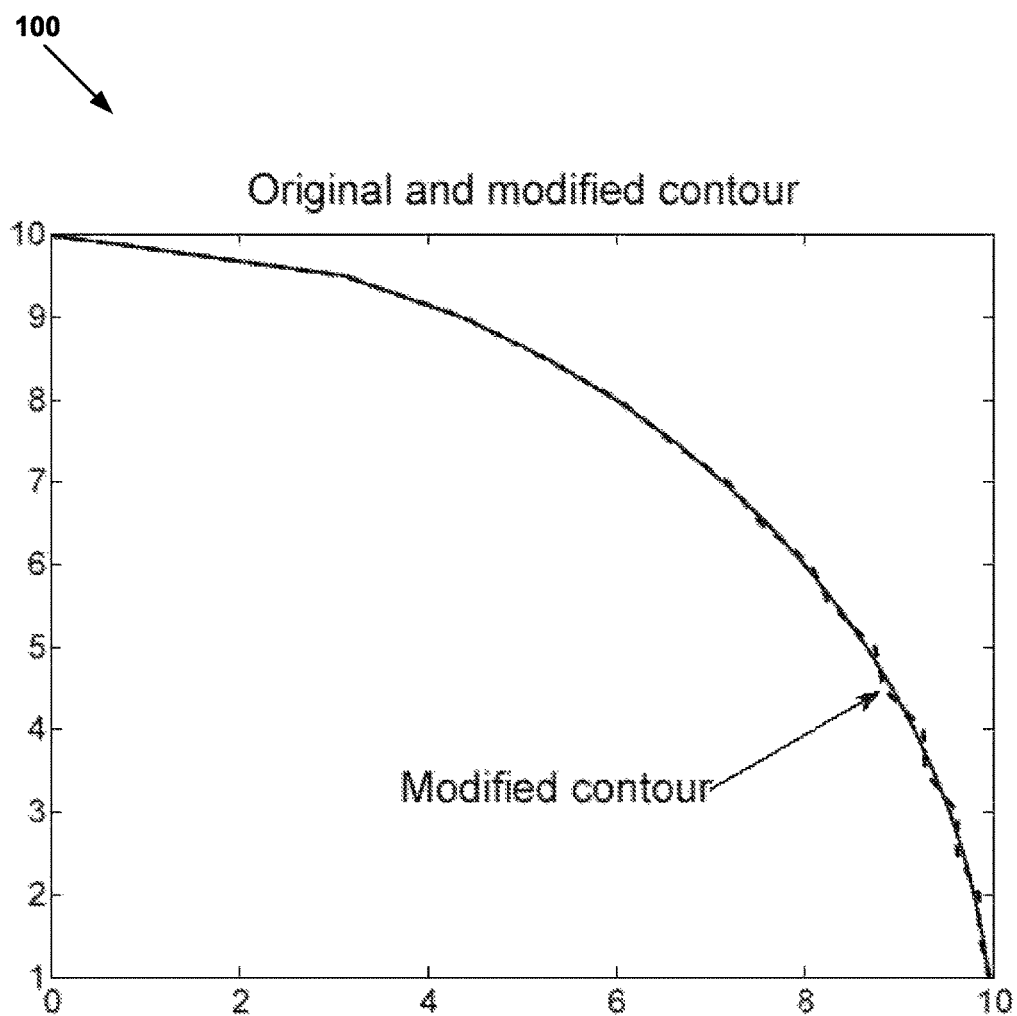
FIG. 1 illustrates a cross section of a quadrant of an object with and without data embedded on its surface.

Serial numbers are a very common method used to identify objects. For instance every car has a globally-unique vehicle identification number (VIN) that can be used to track its history. Similarly, guns have serial numbers etched on them, computer chips have serial numbers, and so on. Some of the reasons for tagging objects include, maintaining inventory, to enable tracking them as they are bought and sold and to allow law enforcement to identify stolen objects. However, it is common for stolen objects to have their serial numbers removed, stolen or even cloned. Indeed, there have been numerous cases recently where VIN numbers are copied from legitimate cars and placed on stolen cars (akin to identity theft). In all of these cases, it would be beneficial to have a method of placing identifying information on an object in a way that makes it very difficult to remove or change.

According to the disclosed technology, changes to the object shape itself are made to reflect the information with which the object is tagged. In some examples of the disclosed technology, surface modulation in which information to be embedded is used to modify the shape of an object. The information can be read back by reading the shape of the surface using high-resolution readers such as laser readers or terahertz readers (e.g., readers using electromagnetic radiation in a frequency range of 100 GHz to 3 THz). The information is static and cannot be changed once it is embedded.

General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "encode," "decode," "transform," "establish," and "manufacture," to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Surface Modulation

The disclosed concepts of surface modulation can be viewed as a type of steganography where information is embedded within the shape of the object's surface. Let us consider an example where we need to embed some bit sequence, for example, "10110010," into the surface of a cylindrical object such as a pillar. Say the radius of this cylinder is 10 cm giving us an equation for the perimeter of $y^2=100-x^2$ assuming some arbitrary x-y axes with the origin at the center (and some fixed z coordinate).

Consider the case of one quadrant of an object surface. The operations to perform include:

1. Let $v_x=[1\ 1.5\ 2\ 2.5\ \ldots\ 9.5\ 10]$ be a discrete vector of x coordinates for which the corresponding y vector is $v_y$.

2. Compute the discrete cosine transform (DCT) $\hat{v}$ of $v_y$.

3. Map the binary data "10110010" into an integer value. For this example we get a value of 178 using a standard binary to integer conversion. We could use Gray codes (as discussed in the present disclosure) or other suitable mappings as well.

4. Replace the highest frequency coefficient of $\hat{v}$ with a scaled value of 178. We will discuss the scale factor later. The new vector is denoted as $\hat{\bar{v}}_y$.

5. Compute the inverse discrete cosine transform of $\bar{v}_y$ to obtain $\acute{v}_y$. This is the actual surface that is built. Observe that it is very like the original but with the information embedded in it. To retrieve the information, the DCT of the surface is computed with the same number of coefficients and take the highest frequency coefficient, scale it appropriately and convert that to binary.

FIG. 1 is a chart 100 illustrating the cross-section of the quadrant with and without the data embedded in it. As we can see, the change to the surface is quite minimal. We note that in this example we are using a one-dimensional (1-D) DCT so the change to the surface occurs on a narrow strip 220 of an object 210, as shown in the illustration 200 of FIG. 2. To read the information, the reader needs to scan along the surface and derive the vector $\acute{v}_y$. This can be accomplished using laser readers or high frequency radio, such as terahertz frequency RF, which is reflected off most surfaces and which has a small enough wavelength and high bandwidth to enable high information packing density. In some examples, more data can be embedded using multiple strips or a two-dimensional (2-D) DCT. While this example is presented in the form of the one-dimensional (1-D) case, as will be readily apparent to one of ordinary skill in the relevant art, the disclosed techniques can also be readily adapted to two-dimensional (2-D) cases as well. For example, whether the data is to be encoded in 1-D or 2-D determines whether a linear or area scanner are to be used.

Examples of applying this technique in the real-world are disclosed. Since static information is being embedded, it is reasonable to build the information into the objects, as disclosed herein. In the case of buildings and other such infrastructure, embedding information in view of the disclosed technology can be performed because existing building methods often use pre-fabricated parts that are either molded (e.g., cement or metal) or machine-cut (e.g., metal or plastic). For both these cases, the information can be incorporated into the mold or into a software controller controlling the machine cutting the shapes. For objects such as automotive engines or guns, data such as serial numbers can be introduced in the shape of the mold used to cast the object. Indeed, in some examples, the outer surface of an engine block (e.g., an entire side of an engine) can be used to store the VIN (the inner part of the engine block is not changed). Finally, for objects being printed using 3-D techniques, incorporating the information onto the surface specification of the object can be performed.

This disclosure addresses issues relating to information packing density (in bits/cm) and how reader resolution, surface curvature and number of DCT coefficients affect this value. Furthermore, since the surface of the object is being changed, it is important to be able to quantify the change or distortion. The present disclosure shows a clear relationship between the surface distortion and the achievable information packing density. A model is disclosed for surface modulation and illustration of the concepts using extensive analysis and simulations. Examples of surface modulation and reading the information back using a terahertz reader are disclosed. Examples of using the data to explore the impact of reader properties on the ability to read the stored information are further disclosed. The relation of surface modulation to tagging objects is further disclosed.

Analysis of Surface Modulation

To develop a systematic understanding of surface modulation, a formal model for discrete cosine transform (DCT) is disclosed. The formal model disclosed below describes the mathematical basis for operation of the disclosed technologies for embedding data on the surfaces of various objects, and reading such data from the object surfaces. This model also underlies computational technologies that can be configured to perform the disclosed methods of analysis. Computer systems configured to perform the disclosed methods, including those computer systems coupled to, and not coupled to, disclosed apparatus for embedding and reading back data from physical objects, can exhibit a number of tangible benefits in reading, analyzing, and embedding such data, including but not limited to: improved performance times, improved error rates, improved security, improved resilience to defects or damage, improved cost or speed of manufacture, amongst other benefits.

Figure 2:
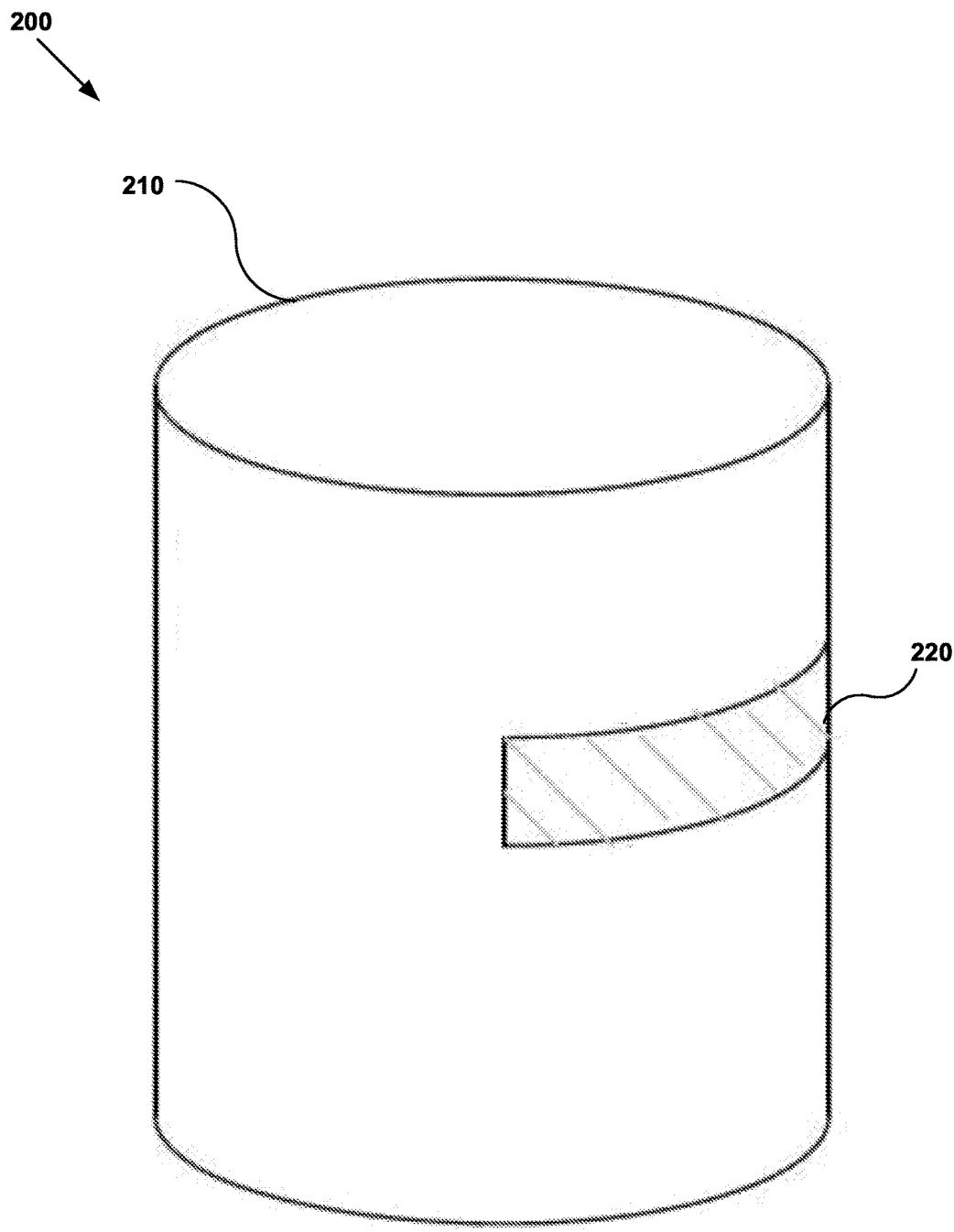
FIG. 2 depicts an object having a modified portion of a surface embedding data occurring along a narrow strip.

Assume that $y=f(x)$ denotes some curve (as noted previously, 1-D DCT is discussed extensively in this paper, for ease of explanation. However, the disclosed techniques can be readily adapted to 2-D DCT examples. However, since we modify a strip on the surface of the object as shown in FIG. 2, we will refer to the technique as surface modulation) on which we will embed information.

For N equally spaced points $v_x=[x_0, x_0+\delta x, \ldots, x_0+(N-1)\delta x]$, $v_y=[y_0, y_1, \ldots, y_{N-1}]$. The N point DCT for $v_y$ is:

$$Y_k = \sum_{n=0}^{N-1} y_n \cos\left[\frac{\pi}{N}\left(n+\frac{1}{2}\right)k\right] \text{ for } k = 0, 1, \ldots, N-1. \quad \text{(Eqn. 1)}$$

The inverse DCT computed on $\hat{v}_y[Y_0, Y_1, \ldots, Y_{N-1}]$ is:

$$yk = \frac{1}{2}Y_0 + \sum_{n=1}^{N-1} y_n \cos\left[\frac{\pi}{N}\left(k+\frac{1}{2}\right)\right], k = 0, 1, \ldots, N-1. \quad \text{(Eqn. 2)}$$

A notable feature of this transform is that most of the signal's energy tends to be located in the low frequency components (for this particular form of DCT, lower index values). Thus, the total energy (or information content) of the higher order coefficients of the DCT is small. This is the reason why, when we modify the high frequency components as in FIG. 1, the overall distortion of the reconstructed surface is small. As will be readily understood to one of ordinary skill in the art, sometimes it is convenient to multiply the transform by $$\sqrt{\frac{2}{N}},$$

which provides an orthogonal matrix for the 2-D case.

In certain examples of the disclosed technology, a series of operations in performing surface modulation according to the disclosed technology include:

1. Let B be a b-bit string with which the surface will be modulated.
2. Consider a sequence of b-bit Gray codes (e.g., consecutive binary strings having a Hamming distance of 1).
3. Determine an index d' of this sequence of Gray codes that corresponds to our binary string B.
4. Compute, $$d = \frac{Y_{N-1}}{\lceil Y_{N-1} \rceil}\left(10^{\lfloor \log_{10}|Y_{N-1}| \rfloor} + \frac{d'+1}{(2^b+1)}(10^{1+\lfloor \log_{10}|Y_{N-1}|\rfloor} - 10^{\lfloor \log_{10}|Y_{N-1}|\rfloor})\right) \quad \text{(Eqn. 3)}$$

that has the same order of magnitude and sign as $Y_{N-1}$. In effect, the interval $[10^{\lfloor \log_{10}|Y_{N-1}|\rfloor}, (10^{1+\lfloor \log_{10}|Y_{N-1}|\rfloor}]$ is divided into $2^b+1$ intervals of length $\Delta$ each and their left boundary labeled as $0, 1, \ldots, 2_b$. The Gray code d' indexes into one of these and the corresponding numeric value of the boundary is assigned to d. For instance, if $Y_{N-1}=-5.1$, b=4, d'=1 then d=-2.0588.

5. d is then used to replace $Y_{N-1}$ in $\hat{v}_y$ to obtain $\bar{v}_y=[Y_0, Y_1, \ldots, Y_{N-2}, d]$. On running the inverse DCT we now get, $\acute{v}_y=[\acute{y}_0, \acute{y}_1, \ldots, \acute{y}_{N-1}]$. This denotes the surface modulated with b bits of data.

6. In order to embed more data, the above operations can be repeated for consecutive sections of the surface and embed b bits every $(N-1)\delta x$ length.

7. To read back the data, we first obtain the vector $v''_y$ (which may differ somewhat from $v'_y$ due to, for example, reader and fabrication error) and find $v''_{N-1}$. This value is rounded to the nearest $\Delta$ (see operation no. 4, above) and returns the label of the left hand boundary of that interval. This value indexes into the sequence of b-bit Gray codes from where we read back our data.

Gray codes can be used such that in the event of error in reading back the surface vector, the number of incorrect bits read may be minimized. In the above example, only one coefficient $Y_{N-1}$ is replaced with the data to encode. In other examples, additional coefficients can be replaced as well, but with the tradeoff that the modulated surface shows increased distortion.

In other examples, codes other than Gray codes can be used. For example, any form of binary coding can be adapted to use the disclosed techniques, including ASCII text coding, group code recording, error correcting codes (ECC), or other suitable encodings.

Given this model for surface modulation, additional analysis is provided below. Since we are encoding information, the two suitable metrics of interest are achievable data rate or information encoding density (bits/cm) and the BER (bit error rate) when reading the information back. A third metric that may also be desirable is the extent of surface distortion F that can be tolerated by the application. Different applications will most likely have different levels of tolerance for surface distortion and this may affect the achievable data rate. The value $\Gamma$ can be measured as, $$\Gamma = \max_{n=0}^{N-1} |y_n - \acute{y}_n| \qquad \text{(Eqn. 4)}$$

where by applying algebra on equations 1 and 2, we obtain, $$|y_n - \acute{y}_n| = \left|(Y_{N-1} - d)\cos\left[\frac{(N-1)\pi}{N}\left(n + \frac{1}{2}\right)\right]\right|. \qquad \text{(Eqn. 5)}$$

There are at least four parameters that influence these three metrics: the number of DCT points N, the separation of the points $\delta_x$, the curvature of the surface (e.g., this can be characterized by the second derivative), and the resolution of the reader v. Reader resolution limits the minimum $\delta_x$ as well as the minimum $|y_n - \acute{y}_n|$ values that are readable and thus places a restriction on data rates. In addition, the surface curvature influences the data rate, with greater curvature yielding higher data rates.

In the following sections the effect of four parameters on the three metrics of interest discussed above are analyzed. The specific relationships discussed include:

For a fixed resolution v and number of coefficients N we examine the BER and surface distortion for different surfaces and different number of bits b encoded in coefficient $Y_{N-1}$, see section entitled "Vary Curvature and b."

For different resolutions v and number of coefficients N, a maximum number of bits b is computed that can be encoded in $Y_{N-1}$ with zero BER, as discussed further in the section below entitled "Vary v and N."

In the section entitled "Modeling the Data Rate," an approximation is derived for the data rate.

Our simulations are done using Matlab software to generate a surface to be modulated and then impose a limitation of reader resolution by rounding all measured values of x and y to $\log_{10} 1/v$ decimal places. Thus, if v is 0.001 cm, then the measured values can be rounded up to 3 decimal places.

Vary Curvature and b

Figure 3:
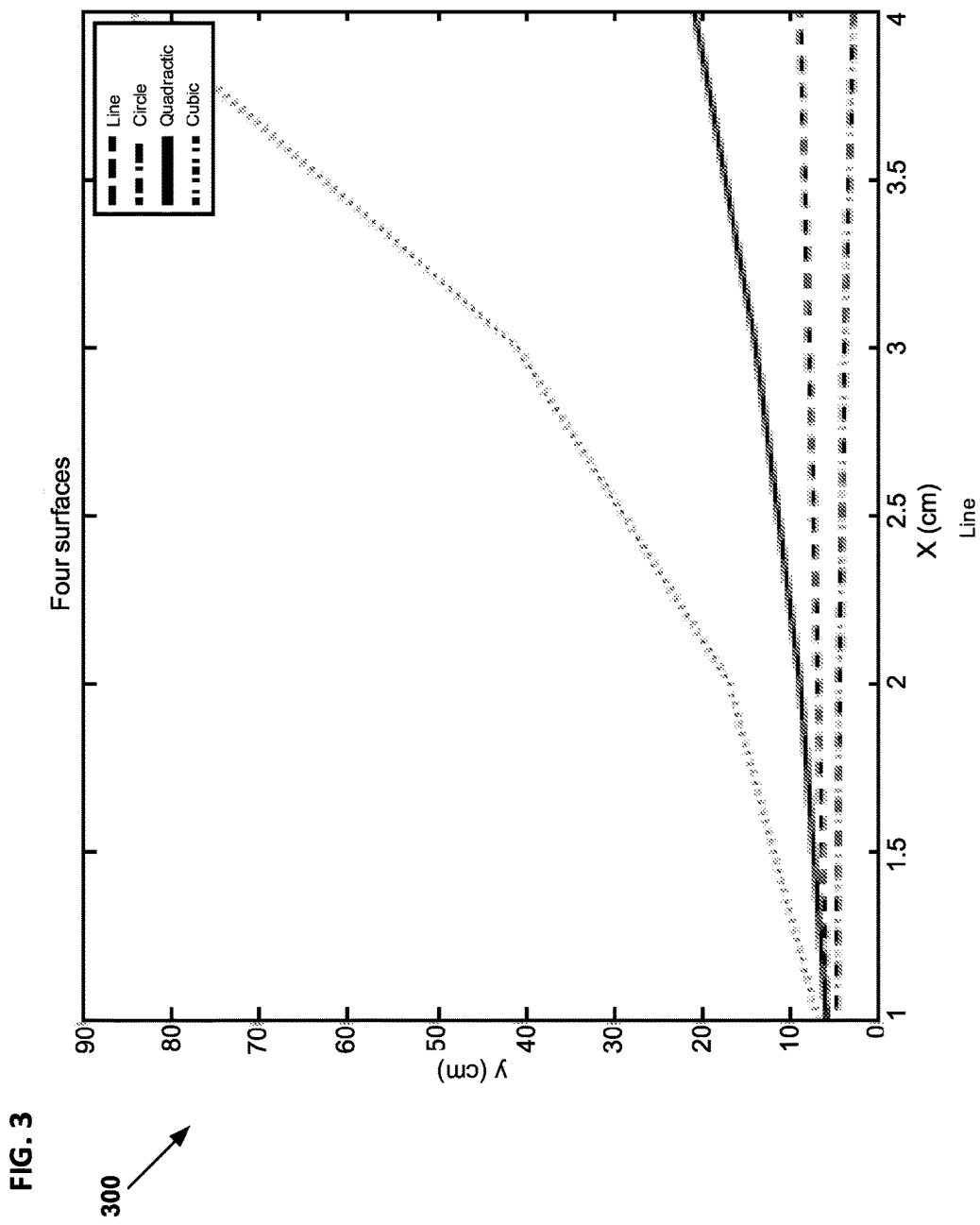
FIG. 3 illustrates the impact of surface curvature when embedding data, as can be performed in certain examples within the disclosed technology.

For this example, it is assumed that the resolution of the reader v is fixed. For example, using a narrow terahertz beam (using a convex lens to focus the beam) then v=0.1 cm can be achieved, in theory. If a laser reader is used, then at least sub-millimeter resolutions can be obtained. In the simulations described in this section, it is assumed that v=0.01 cm and we will use N=4 DCT coefficients with $\delta x$=1 cm. In order to examine the impact of surface curvature, four different surfaces are used: flat surface (linear), circle, a quadratic surface, and a cubic surface. The respective equations are, y=x+5, y=$\sqrt{25-x^2}$, y=$x^2$+5, $x^3+x^2+5$. The part of the surface being modulated for each case is shown in the chart 300 of FIG. 3.

Figure 4:
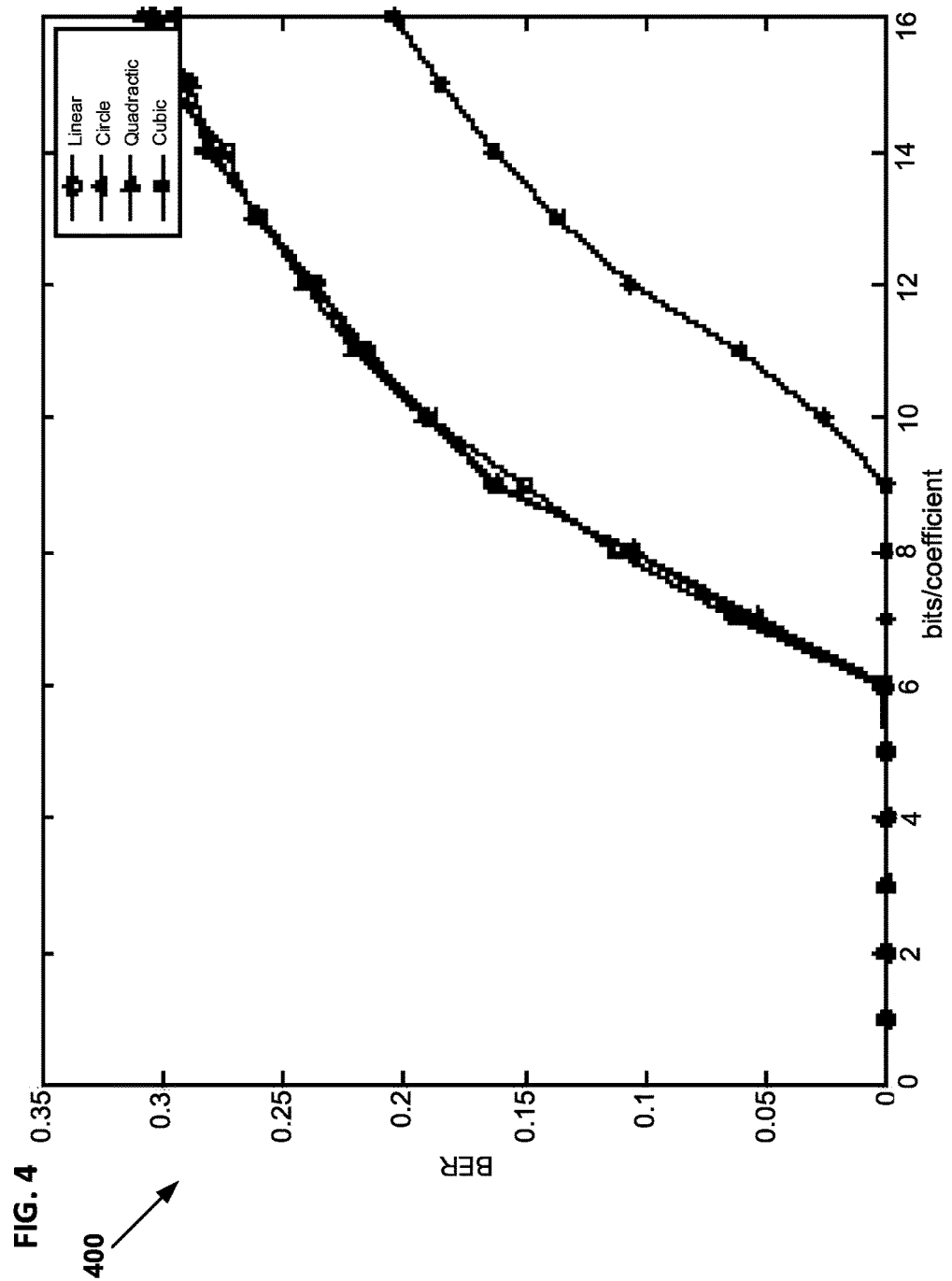
FIG. 4 is a chart plotting the bit error rate versus number of bits encoded on a surface, as can be observed in certain examples of the disclosed technology.

In FIG. 4, a chart 400 plots the BER versus number of bits encoded is plotted in the fourth coefficient $Y_3$. As shown, the cubic surface, that has the highest curvature, can encode 9 bits/coefficient with no error whereas the other three surfaces can encode no more than five bits. On the other hand, looking at the chart 500 of FIG. 5 we see that the surface distortion for the cubic surface is almost 1.5 cm while it is approximately 0.2 cm for the other three surfaces. While 1.5 cm may seem high, observe from FIG. 3 that the y coordinates for the cubic surface are an order of magnitude bigger than the other surfaces. Thus the distortion is relatively of the same order. To understand the reason for the greater absolute distortion for the cubic surface we next derive an exact formula for $\Gamma$ below.

Theorem 1: The maximum distortion can be written as, $$\Gamma = \begin{cases} |Y_{N-1} - d|, & \text{odd } N \\ \left|Y_{N-1} - d\right)\cos\left(\frac{\pi}{2N}\right)\right|, & \text{even } N \end{cases}$$

Proof: Consider Eqn. 4. In order to determine $\Gamma$ we find the n for which $|y_n - \acute{y}_n|$ is maximized. Note that the only term in the expression which depends on n is $\cos(\pi(N-1)/N(n+\frac{1}{2}))$. Consider two cases: N is odd or N is even. For odd N, consider n=(N−1)/2. Using Eqn. 5 we obtain, $$\left|y_{\frac{N-1}{2}} - \acute{y}_{\frac{N-1}{2}}\right| =$$
$$\left|(Y_{N-1} - d)\cos\left(\frac{\pi(N-1)}{N}\left(\frac{N-1}{2} + \frac{1}{2}\right)\right)\right| = \left|(Y_{N-1} - d)\cos\left(\pi\frac{(N-1)}{2}\right)\right|.$$

Since N is odd, (N−1)/2 is a whole number and therefore the cos term gives us ±1, thus giving us maximum $\Gamma = |(Y_{N-1} - d)|$.

Next, consider the case when N is even. The absolute value of the cos term in Eqn. 4 is maximum (and equal) for n=N/2 and N/2+1. Using n=N/2 in Eqn. 5, we obtain, $$\left|y_{\frac{N}{2}} - \acute{y}_{\frac{N}{2}}\right| = \left|(Y_{N-1} - d)\cos\left(\frac{\pi(N-1)}{N}\left(\frac{N}{2} + \frac{1}{2}\right)\right)\right|.$$

Considering the cos term we have, $$\cos\left(\frac{\pi N - 1}{N}\left(\frac{N}{2} + \frac{1}{2}\right)\right) =$$
$$\cos\left(\frac{\pi(N^2 - 1)}{2N}\right) = \cos\left(\frac{\pi N}{2}\right)\cos\left(\frac{\pi}{2N}\right) + \sin\left(\frac{\pi N}{2}\right)\sin\left(\frac{\pi}{2N}\right) = \pm\cos\left(\frac{\pi}{2N}\right).$$

Since N is even, $\pi N/2$ is an integer multiple of $\pi$, which simplifies the above expression as shown.

Figure 5:
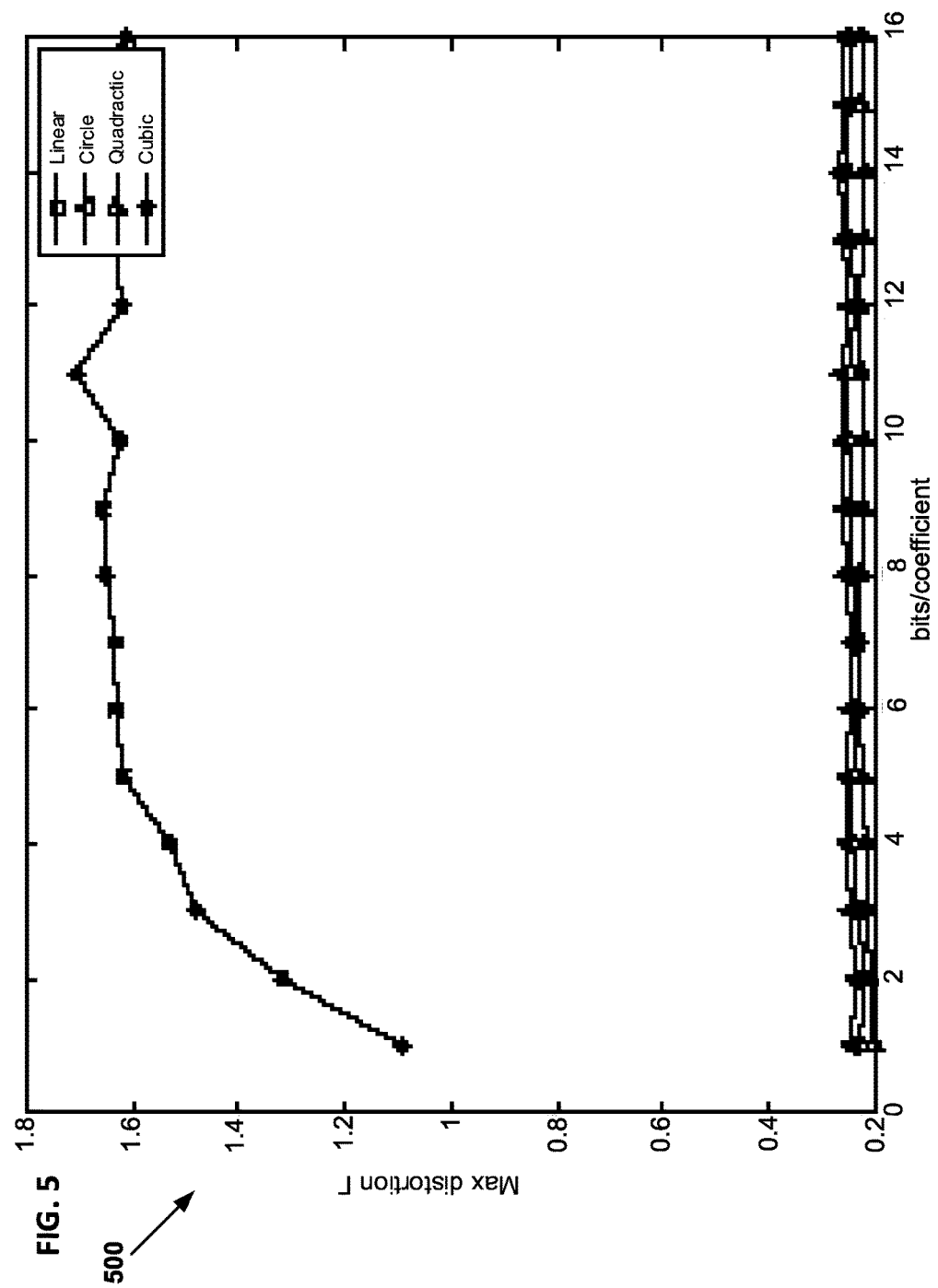
FIG. 5 is a chart illustrating surface distortion for a number of different types of surfaces, as can be observed when using certain examples of the disclosed technology.

The relative distortion for a linear surface and the cubic surface for the foregoing example is shown in the chart 500 of FIG. 5. From Theorem 1 it is observed that the primary factor affecting distortion is the $|(Y_{N-1}-d)|$ term. On average, the order of magnitude of this term is $10^{\lfloor \log_{10}|Y_{N-1}| \rfloor}$. Since the $Y_{N-1}$th coefficient for a cubic surface is at least one order of magnitude greater than for the linear surface, a greater distortion is shown for the cubic surface.

Vary v and N

Figure 6:
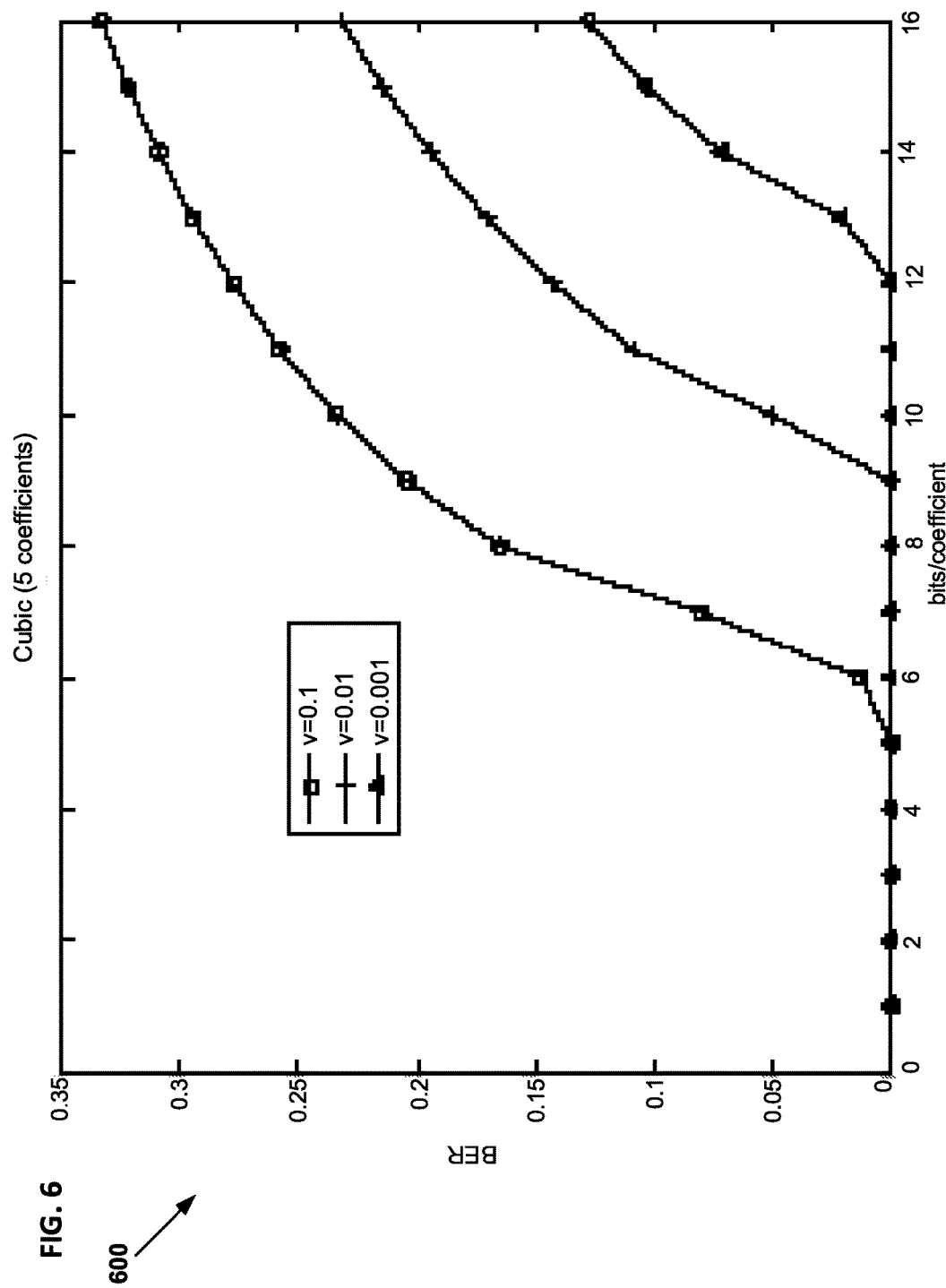
FIG. 6 is a chart that charts the bit error rate versus bits per coefficient for a cubic surface, as can be observed in certain examples of the disclosed technology.
Figure 7:
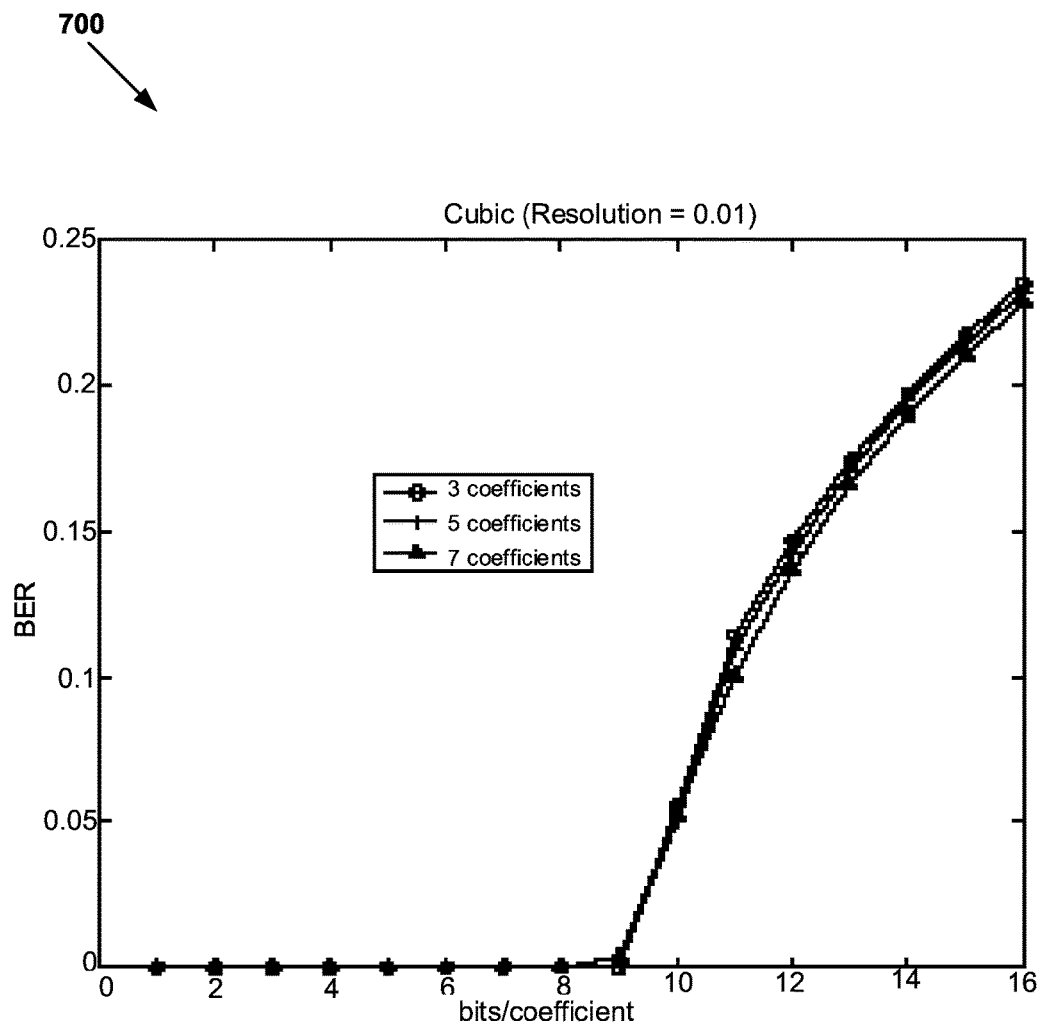
FIG. 7 is a chart illustrating the effect of number of coefficients used in embedding data in an object, as can be observed in certain examples of the disclosed technology.

This section examines the effects of varying reader resolution v and the number of coefficients N on the achievable data rate and BER for the foregoing example. FIG. 6 is a chart 600 that plots the BER versus bits/coefficient for the cubic surface when the resolution is varied between 0.1, 0.01 and 0.001 cm for N=5 coefficients. FIG. 7 is a chart 700 that plots the same quantities but for the case when the number of coefficients is varied between 3, 5 and 7 and constant resolution at v=0.01 cm.

Figure 8:
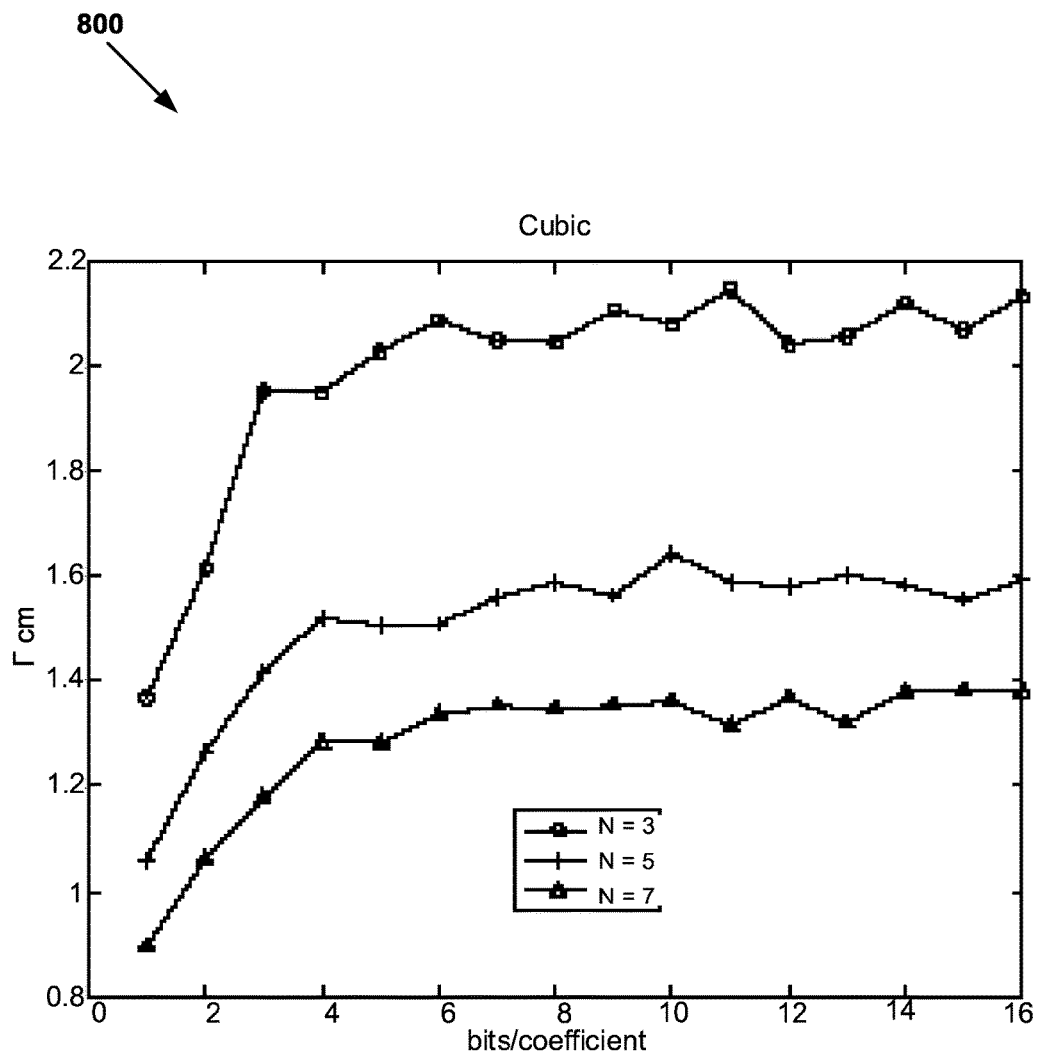
FIG. 8 is a chart that plots the distortion of a cubic surface as a function of different values, as can be observed in certain examples of the disclosed technology.

It is observed that increasing the resolution results in an increase in the number of bits that can be encoded in the $Y_{N-1}$th coefficient. Thus, as more bits are embedded into the coefficient, the relative changes in $\acute{y}_n$ values is smaller can only be read by increasing the resolution. Similarly, FIG. 7 shows that for a fixed resolution, increasing the number of coefficients does not increase the data rate. Again this is consistent, because a fixed resolution limits the smallest variation in $\acute{y}_n$ values that can be read. FIG. 8 is a chart 800 that plots the distortion of the cubic surface as a function of different values of b for three values of N=3, 5, 7 coefficients. This plot illustrates that using more coefficients is beneficial in that the distortion is smaller. However, when we compare with FIG. 7, we see that using 7 coefficients we can only encode 8 bits into $Y_{N-1}$ with zero BER while when using fewer coefficients we can encode 9 bits. Thus, there is a tradeoff between reducing distortion and bits encoded in $Y_{N-1}$.

Figure 9:
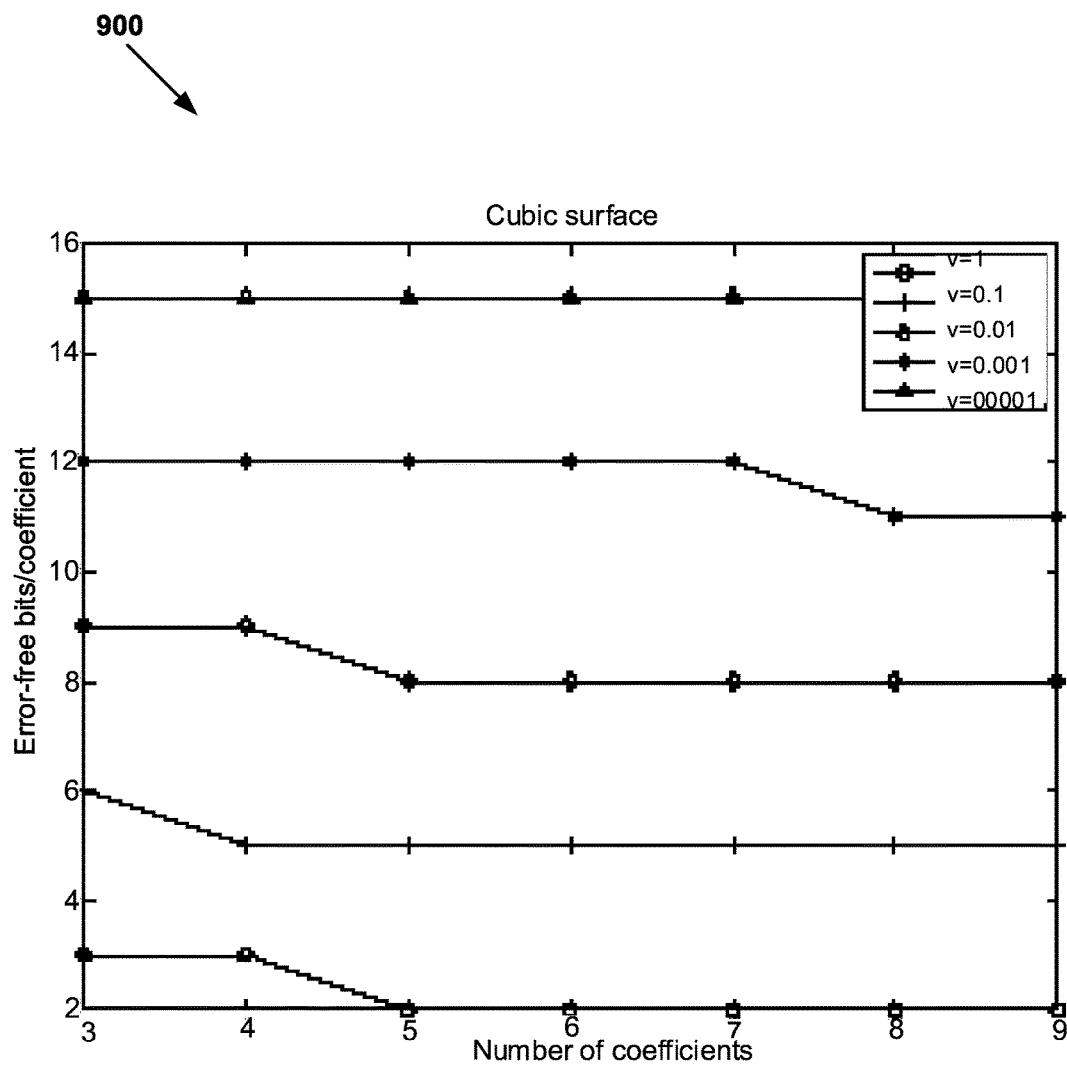
FIG. 9 is a chart illustrating error free data rates for a cubic surface, as can be observed in certain examples of the disclosed technology.

In the chart 900 of FIG. 9, the maximum number of bits that can be encoded in $Y_{N-1}$ is plotted for different resolutions for the cubic surface such that the BER is zero. As FIG. 9 shows, this value increases from 2 bits/coefficient (when using 5 coefficients) for v=1 to 15 bits/coefficient when v=0.0001 cm. The relationship between these various quantities is formally explained in theorem 2 below.

Theorem 2: For a given resolution v and a number of DCT coefficients N, the maximum number of bits/coefficient b that can be embedded in $Y_{N-1}$ is given by, $$b \leq \log_2 \left| \frac{1}{v}(10^{1+\lfloor \log_{10}|Y_{N-1}|\rfloor} - 10^{\lfloor \log_{10}|Y_{N-1}|\rfloor}) \times \cos\left(\frac{\pi(N-1)\left(N-\frac{1}{2}\right)}{N}\right) \right| - 1. \quad \text{(Eqn. 6)}$$

Proof: Since v represents the smallest unit of length that can be read, the smallest surface distortion is desirably greater than v. In other words, $v \leq \min_{n=0}^{N-1} |y_n - \acute{y}_n|$ where Eqn. 5 gives us the value of the right hand side.

One way to minimize this quantity is to minimize the cosine term as well as the value of $|Y_{N-1}-d|$. For example, the cosine term is minimized when n=N-1. Therefore, after substituting N-1 for n and simplifying, $$v \leq \left| Y_{N-1} - d \right| \cos\left(\frac{\pi(N-1)\left(N-\frac{1}{2}\right)}{N}\right) \right|. \quad \text{(Eqn. 7)}$$

This expression can be simplified by approximating $|Y_{N-1}-d|$ as follows.

For a given number of bits b the interval can be divided between $[10^{\lfloor \log_{10}|Y_{N-1}|\rfloor}, 10^{1+\lfloor \log_{10}|Y_{N-1}|\rfloor}]$ into $2^b+1$ equal intervals of length Δ and then each of the $2^b$ bit strings can be assigned to the interval boundaries. The value $Y_{N-1}$ will lie within one such interval, for example, [d−Δ, d]. Since $Y_{N-1}$ is replaced with d when performing surface modulation, the resolution v is selected to be large enough to distinguish between consecutive values such as d−Δ and d. Therefore $|Y_{N-1}-d|$ can be bounded as the length of one such interval Δ. This gives us the following approximation, $$|Y_{N-1} - d| \leq \frac{1}{(2^b+1)}(10^{1+\lfloor \log_{10}|Y_{N-1}|\rfloor} - 10^{\lfloor \log_{10}|Y_{N-1}|\rfloor}).$$

Substituting this value in the expression for v, $$v \leq \frac{1}{(2^b+1)}(10^{1+\lfloor \log_{10}|Y_{N-1}|\rfloor} - 10^{\lfloor \log_{10}|Y_{N-1}|\rfloor})\cos\left(\frac{\pi(N-1)\left(N-\frac{1}{2}\right)}{N}\right)$$

and upon solving this expression for b a result is obtained.

Figure 10:
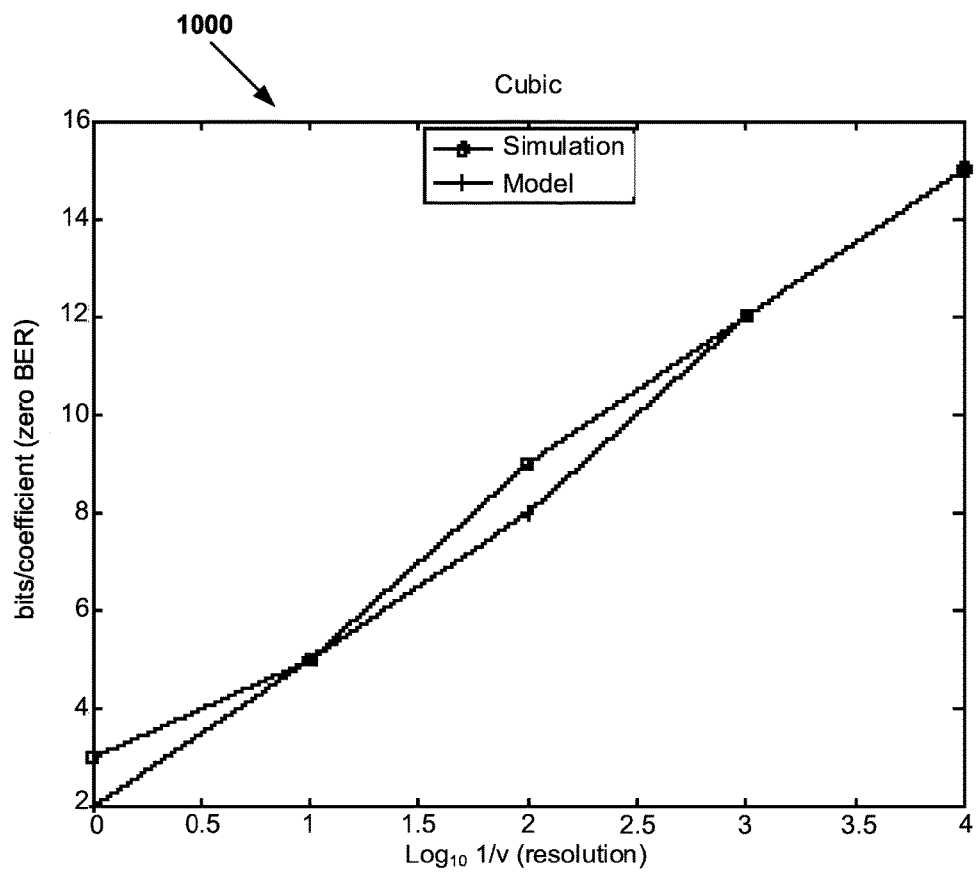
FIG. 10 is a chart that illustrates the number of bits that can be encoded per coefficient without error in a cubic case example, as can be observed in certain examples of the disclosed technology.

In the chart 1000 of FIG. 10, the number of bits that can be encoded per coefficient with no error when N=5, δx=1 cm is plotted for different resolutions for the cubic case example. In the plot of FIG. 10 simulation results as well as results from the model in Eqn. 6 are shown. As shown, the agreement between simulation and the model is very good.

Modeling the Data Rate

Utilizing Theorem 2 above, an approximation can be derived for the achievable data rate for surface modulation. By using a DCT with N coefficients and encoding b bits in $Y_{N-1}$, the data rate obtained is b/(N−1)δx bits/cm. By substituting the value for b from Eqn. 6, $$C = \frac{\log_2 \left| \frac{1}{v}(10^{1+\lfloor \log_{10}|Y_{N-1}|\rfloor} - 10^{\lfloor \log_{10}|Y_{N-1}|\rfloor}) \times \cos\left(\frac{\pi(N-1)\left(N-\frac{1}{2}\right)}{N}\right) - 1 \right|}{N\delta x}. \quad \text{(Eqn. 8)}$$

Figure 11:
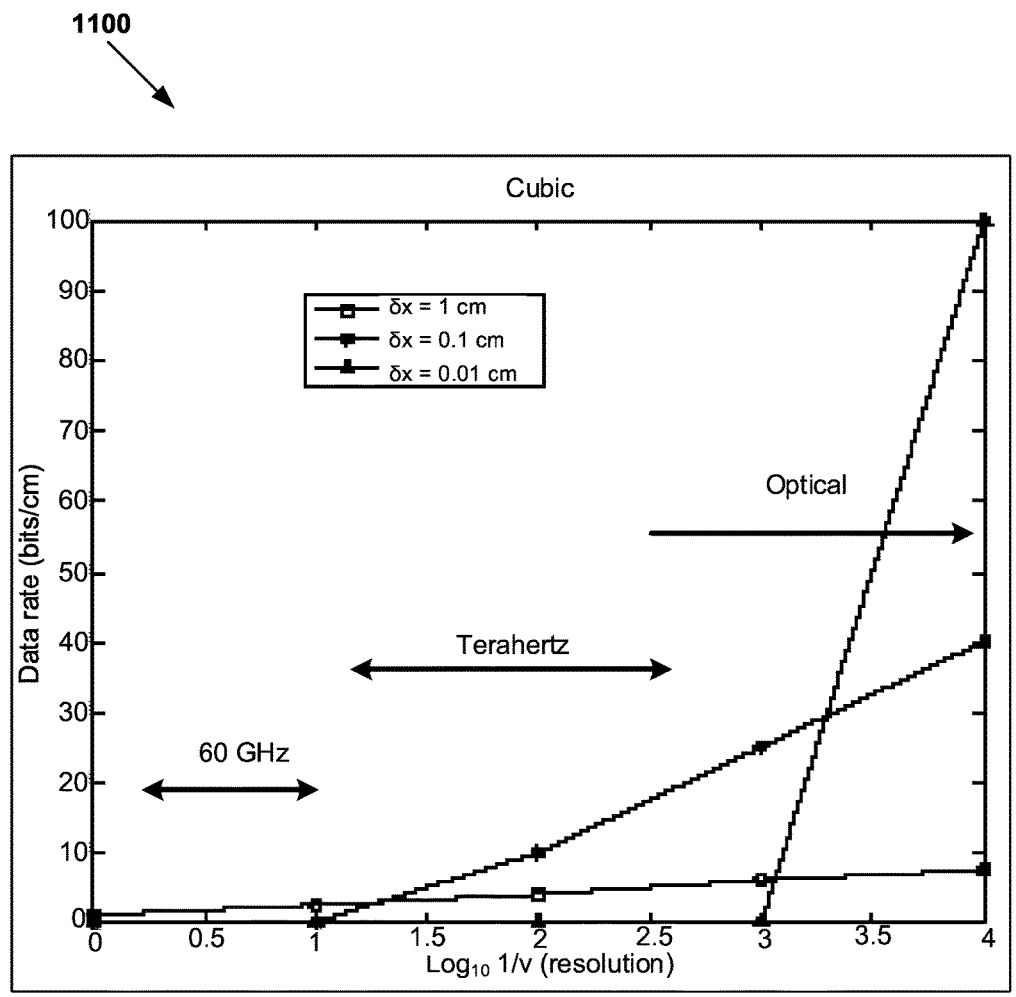
FIG. 11 is a chart illustrating achievable data rates when using different readers, according to certain examples of the disclosed technology.

In the chart 1100 of FIG. 11, the data rate is plotted versus resolution for the cubic case for three different values of δx. The x-axis plots $\log_{10} 1/v$, which means that higher values denote finer resolution. The y-axis plots the data rate in bits/cm. Thus, FIG. 11 illustrates a range of data rates achievable for different reader possibilities. Since 60 GHz radios have a wavelength of about 5 mm, the maximum data rate they can typically achieve is less than 2.5 bits/cm. Terahertz readers can generally achieve higher data rates of between 10-15 bits/cm depending on the frequency selected (since different terahertz readers can have variable frequency ranges in the interval from 100 GHz to 3 THz). Finally, laser readers can achieve data rates in excess of 100 bits/cm (corresponding to the case when δx=0.001 cm and v=0.0001 cm and smaller).

Using Alternative Transforms

Figure 12:
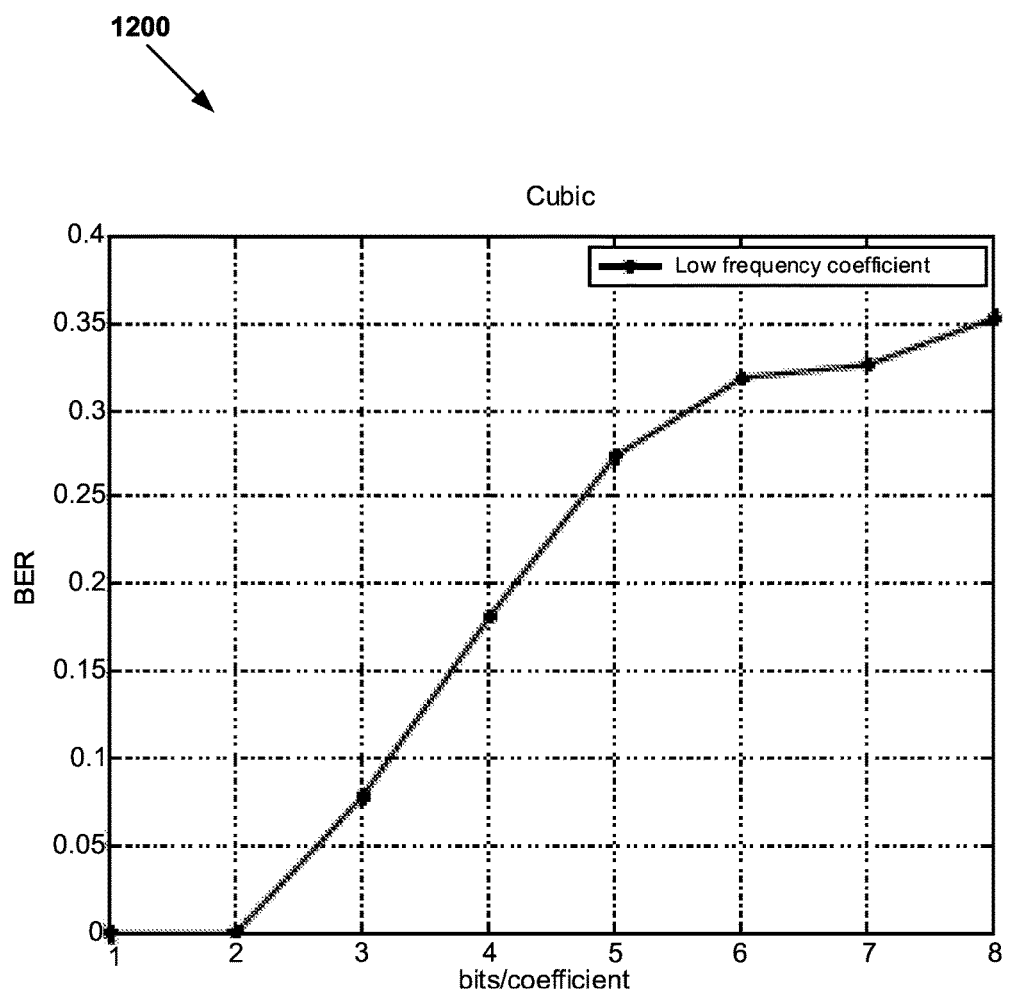
FIG. 12 is a chart illustrating bit error rates when using a discrete wavelet transform for a cubic surface, as can be observed in certain examples of the disclosed technology.
Figure 13:
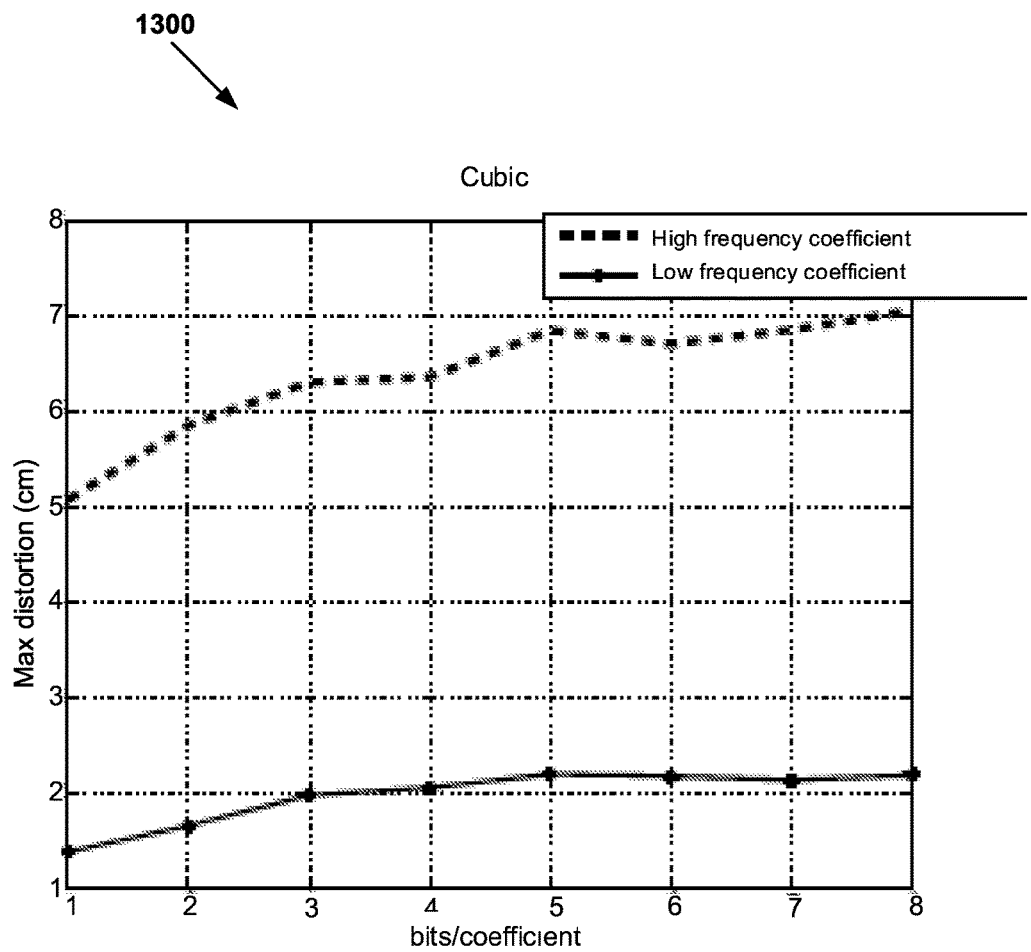
FIG. 13 is a chart illustrating distortion when using a discrete wavelet transform, as can be observed in certain examples of the disclosed technology.

This section discusses another transform that can be employed in certain examples of embedding and reading data on an object surface, the Discrete Wavelet Transform (DWT) and explain differences over using DCT for disclosed techniques. Mathematically, the DCT captures the frequency content of the signal, whereas the DWT also captures the spatial content (e.g., where those frequencies occur). This can yield a potential benefit in image compression and image processing. However, from the point of view of surface modulation, this spatial locality may not be beneficial in certain examples. Since the DCT computes the frequency coefficients over the entire signal, when data is encoded in the high frequency coefficient, the data is diffused through the entire surface. If we do that using the high-frequency coefficients of the DWT (that exhibit spatial locality) with finite reader resolution, this can result in very high BER. Indeed, to match the BER of DCT we need to encode the data in the low-frequency coefficients of the DWT. The chart 1200 of FIG. 12 plots the BER versus bits/coefficient for the DWT when coding data in the low frequency component. The BER when encoding in the high frequency component is near 50% (not shown). The measured distortion is shown in the chart 1300 of FIG. 13. Thus, due to the high BER and high distortion with the DWT, the examples discussed herein are illustrated primarily using DCT, although other examples can be employed.

Experimental Results

Figure 14:
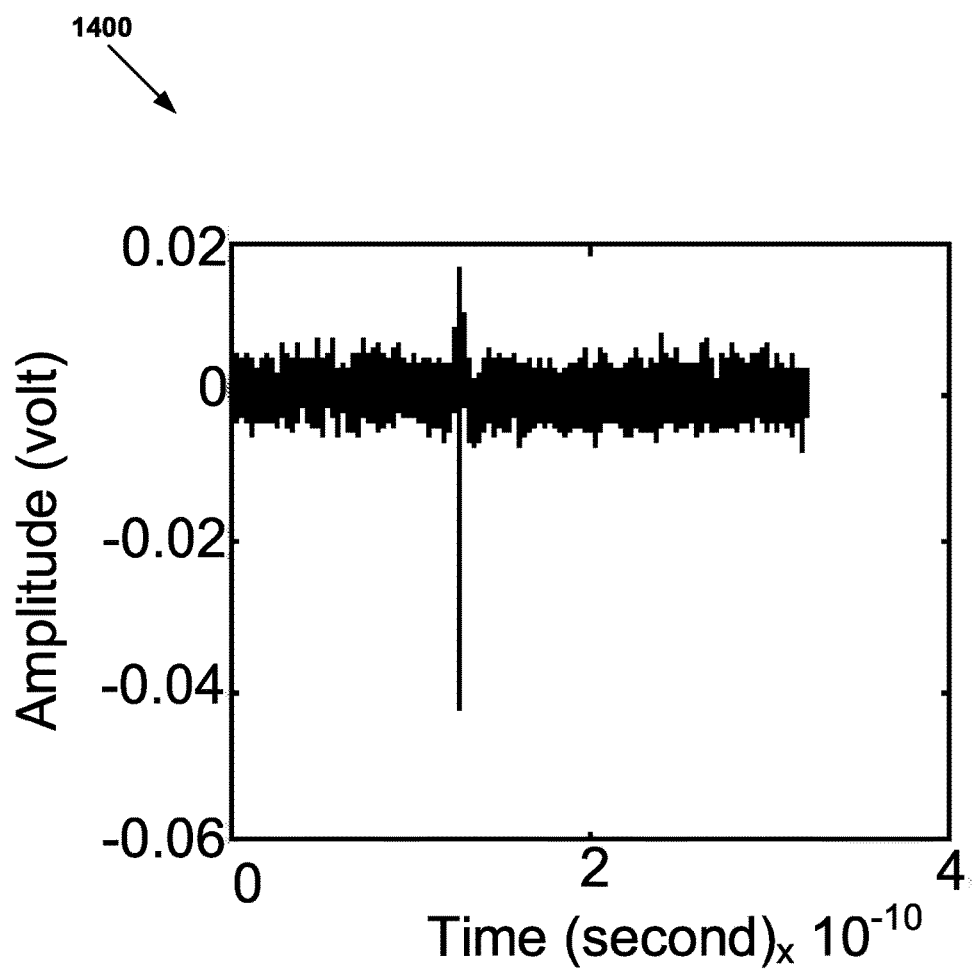
FIG. 14 is a chart illustrating the time domain of a reflected signal, as can be observed in certain examples of the disclosed technology.
Figure 15:
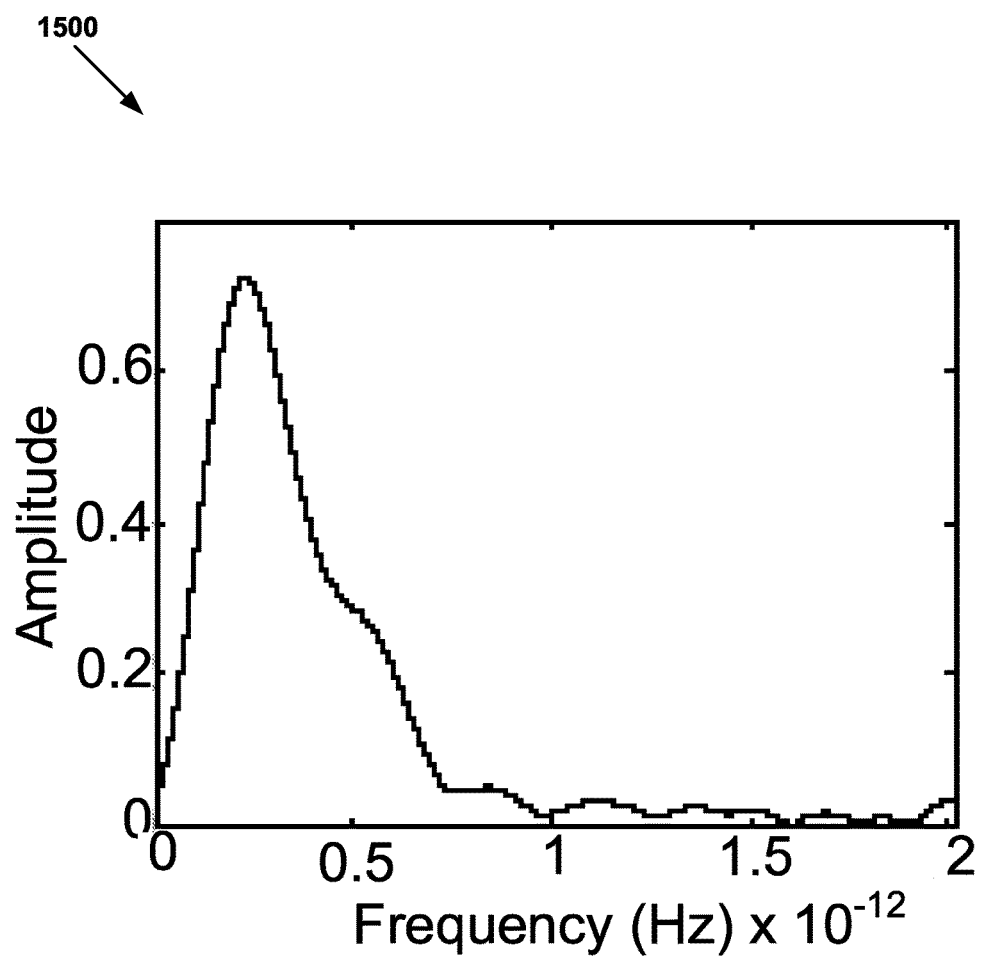
FIG. 15 is a chart illustrating the frequency domain of the reflected signal of FIG. 14, as can be observed in certain examples of the disclosed technology.

In order to demonstrate the overall idea of surface modulation and examine practical issues related to creating and reading this form of encoded data, some example plastic objects that have information embedded on them were manufactured. The reader we used is a terahertz system called Picometrix T-Ray 4000. This system produces picosecond long pulses occupying the frequency range of 100 GHz to 2 THz. A 1-inch lens was used to narrowly focus the terahertz beam. The chart 1400 of FIG. 14 shows an example of the reflected pulse from the plastic surface we use for building our objects. In the chart 1500 of FIG. 15 the frequency domain of the received pulse is plotted. As illustrated, most of the energy of the pulse is concentrated in frequencies below 0.7 THz.

Design of Objects

Figure 16:
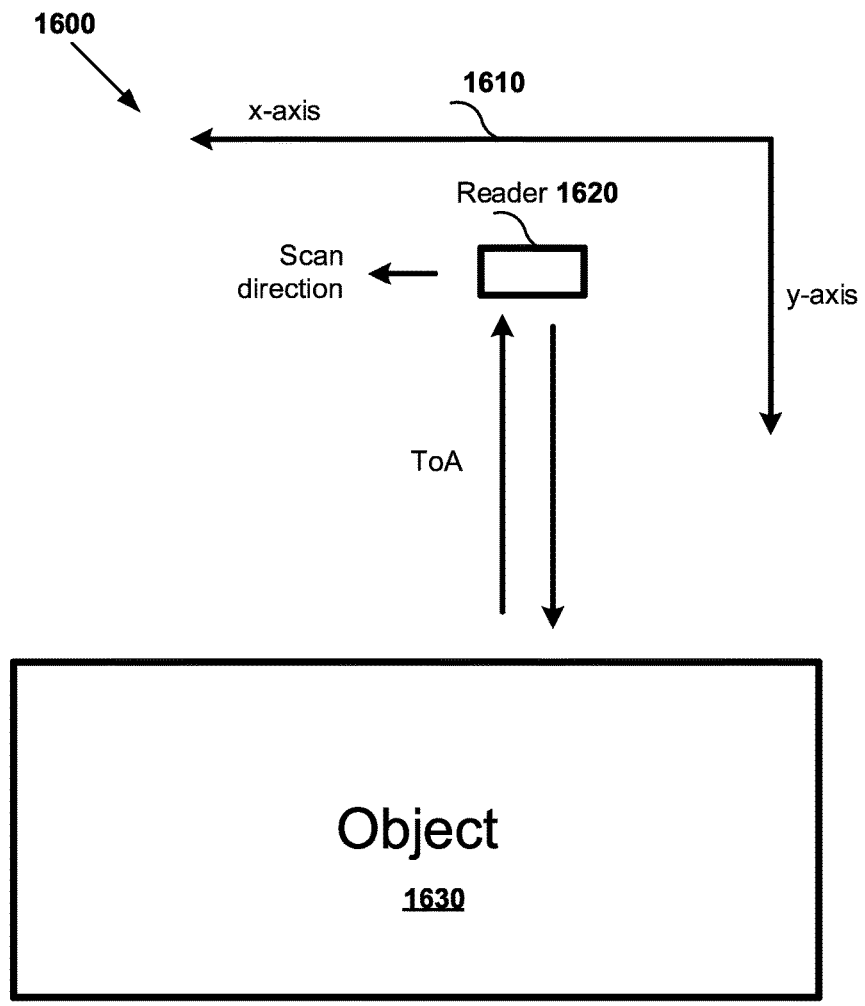
FIG. 16 is a diagram illustrating a coordinate system overlaid on an object, as can be observed in certain examples of the disclosed technology.

For certain disclosed measurement studies, a linear surface is selected upon which to embed the information. The reason for this choice is that in these examples, the terahertz reader is constrained to move along on a 2-D plane. It should further be noted that, in order to construct the modulated surface, the coordinate system 1610 of the reader 1620 is used as shown in FIG. 16, rather than a coordinate system from the point of view of the object 1630. In certain implementations, this is the correct coordinate system to use for creating surface modulated objects since the reader is outside the surface.

Consider the selection of the other parameters, including N, δx, b number of bits/coefficient and v. For v a value of 0.01 cm is used, which is of the same order of magnitude as the wavelength of the higher frequency components of the terahertz beam. Consider the selection of δx, which is selected such that δx>v. However, in certain practical readers, it has been observed that the dominating factor is the beam diameter. If we attempt to read consecutive $\hat{v}_{y'}$ values at x separations less than the beam diameter, a signal is received that can produce inaccurate Time of Arrival (ToA) information. To illustrate this point, we constructed a linear surface with a sequence of valleys and peaks that are +0.2 cm and −0.1 cm, respectively, from the level. The separation of these max and min values is 0.2 cm as illustrated in the chart 1700 of FIG. 17. FIG. 18 is a chart 1800 that plots the reconstructed surface using ToA data from our terahertz system. The values for the peaks are read correctly but, while the valleys are supposed to be at −0.1 cm, the ToA gives us a value of +0.1 cm.

Figure 18:
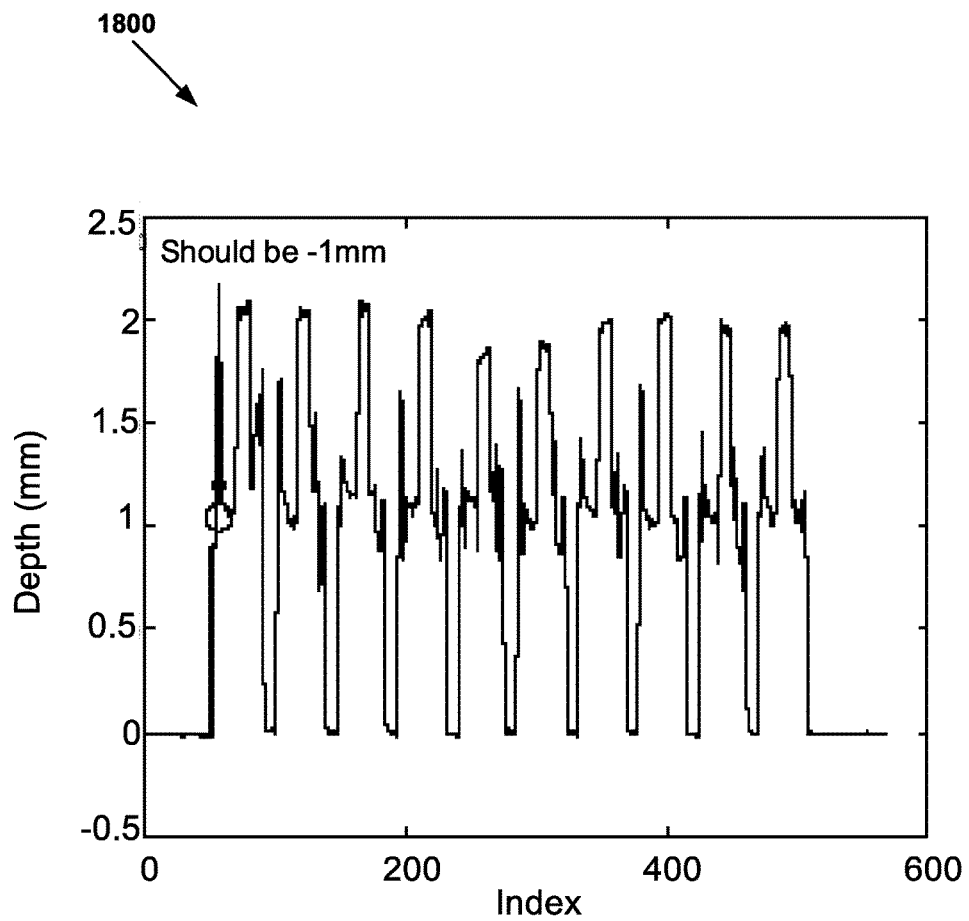
FIG. 18 is a chart illustrating errors in reading a surface using time of arrival, as can be observed in certain examples of the disclosed technology.
Figure 19:
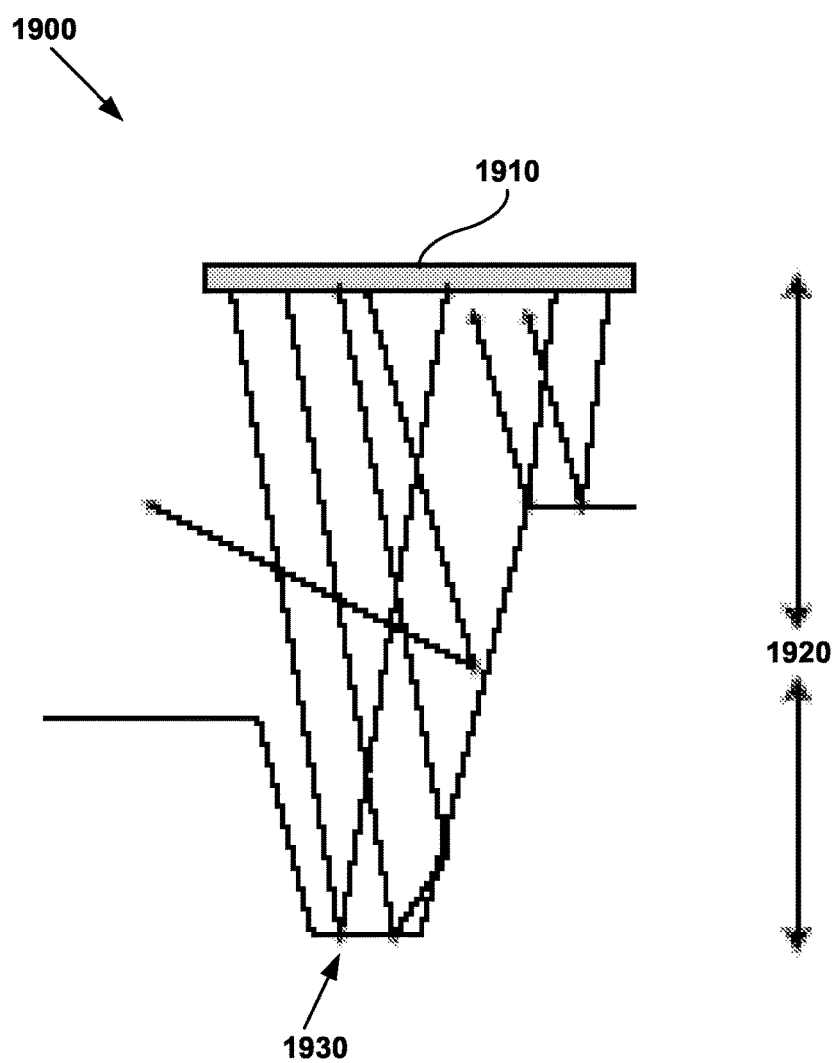
FIG. 19 is a cross section of an object having embedded data illustrating sources of measurement error, as can be observed in certain examples of the disclosed technology.

The reason for this error can be explained by the diagram 1900 of FIG. 19. The reader head 1910 (comprising the lens) has a diameter of 1.5 inches (3.81 cm) and produces a circular spot at the focal length 1920 of the focused reader beam. As shown in the diagram 1900, the focus is slightly beyond the valley and note that the spot produced is not a point but has a non-zero diameter. The various rays from the lens hit the surface at a variety of angles, with the most prominent ones being reflected off the peak. Due to the range of path lengths the rays take, the receiver sees the reflected pulse spread in time and on performing an auto-correlation we get a value for distance that is approximately an average of the different path lengths. This results in the large error shown in the chart 1800 of FIG. 18.

Figure 17:
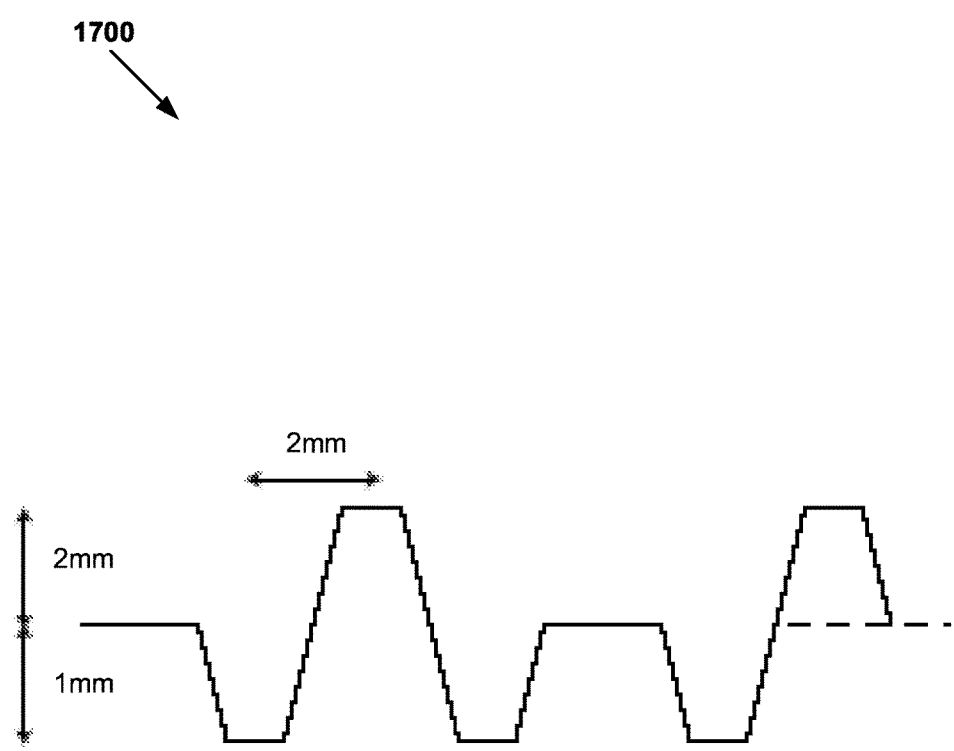
FIG. 17 is a chart depicting a linear surface having embedded data manufactured according to certain examples of the disclosed technology.

To reduce this error, we select δx that is large enough such that the rays reflected from the valley for the surface modulations shown in FIG. 17 are predominant in the reconstructed pulse. Indeed, δx~spot diameter is a reasonable value to select. However, observe that the size of the spot will increase the further away the surface is from the focal length. To get a reasonable estimator for δx, certain disclosed examples (1) estimate the diameter of the spot at focus and then (2) determine the spot size at points of maximum distortion Γ, assuming that the beam is focused on the smooth surface of the object.

In order to determine the diameter of the spot at focus, an approximation of the beam produced by the terahertz system can be used. Since the lens used in this example is parabolic, the beam can be approximated as a Gaussian beam whose intensity from the center degrades as a Gaussian to the edges. The diameter of the spot at focus is then approximately, diameter $$\alpha = \frac{4\lambda}{\pi} \frac{F}{D}$$

wherein F is the focal length of the lens and D is the diameter of the lens. The depth of focus is given by, $$\text{depth of focus} = \frac{8\lambda}{\pi} \left(\frac{F}{D}\right)^2.$$

Figure 20:
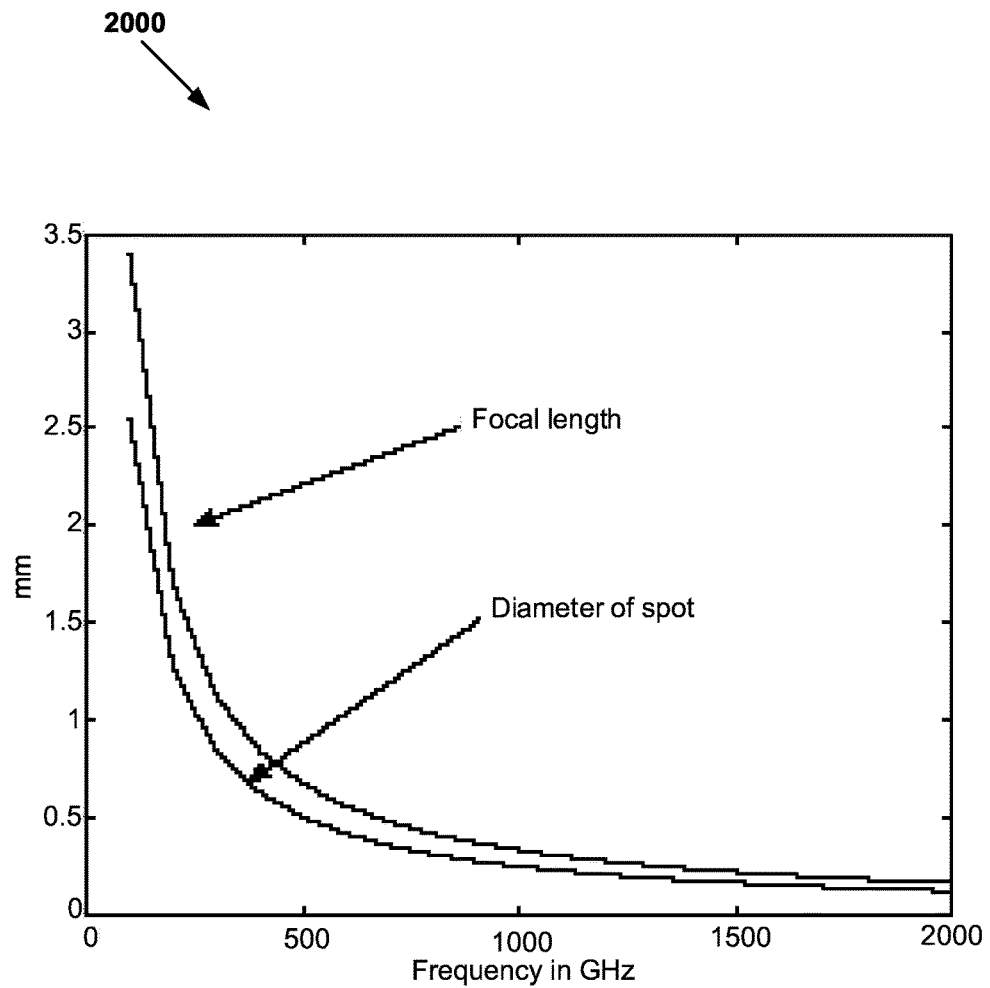
FIG. 20 is a chart illustrating certain lens properties, as can be observed when using certain examples of the disclosed technology.

For certain disclosed experiments, a lens with a focal length F of one inch and a diameter D of 1.5 inches is used. A plot of these values for the frequency range of the terahertz system is shown in the chart 2000 of FIG. 20. As we can see, the diameter of the spot at focus varies between 2.5 mm (at 100 GHz) to 0.25 mm (at 750 GHz). If we instead a smaller focal length is used, this size decreases linearly.

Figure 21:
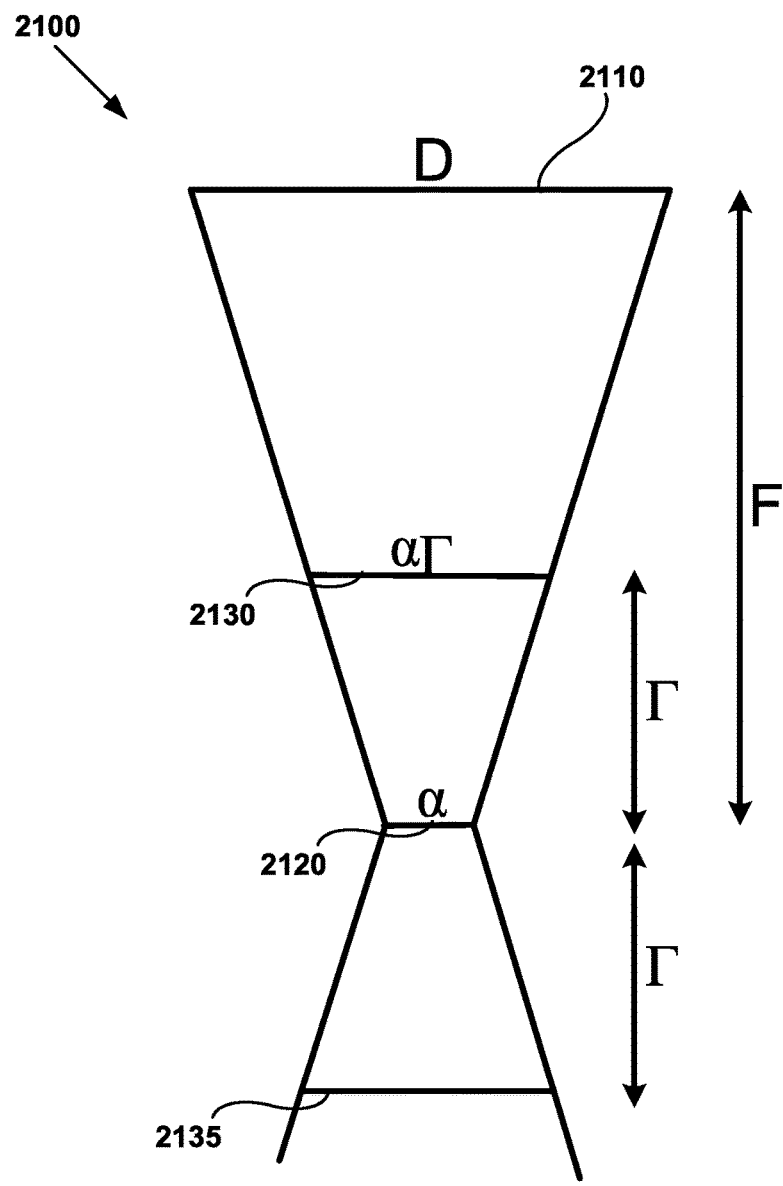
FIG. 21 illustrates a model of spot size, as can be observed when using certain examples of the disclosed technology.

Assume that the focus is placed on the surface of the object that does not contain data. We estimate the spot diameter on the part of the surface containing the data. In other words, if the maximum distortion of the surface is Γ, the diameter of the spot at ±Γ distance from the focal plane can be determined. FIG. 21 is a diagram 2100 that illustrates a relation between components of an image reading system including a lens 2110 of diameter D, a focal length F, distortion Γ, a spot diameter 2120 at focus α, and the size of the spot diameter 2130 and 2125 at a Γ distance from focus $\alpha_\Gamma$. A geometric relationship gives us the size of the spot as $$\alpha\Gamma = \alpha + \frac{\Gamma(D-\alpha)}{F}.$$

Figure 22:
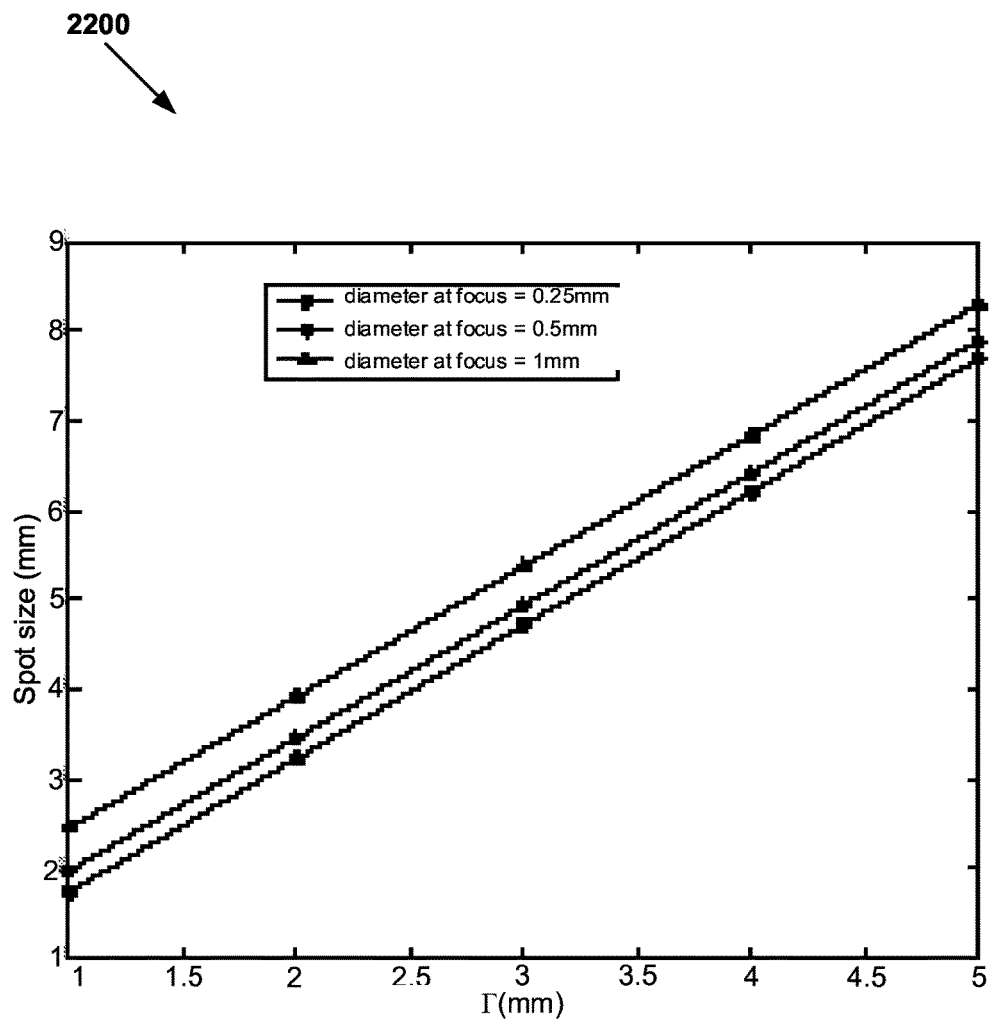
FIG. 22 is a chart illustrating an example of estimating spot sizes, as can be observed in certain examples of the disclosed technology.

In FIG. 22, a chart 2200 illustrates the spot size plotted as a function of maximum distortion Γ for three different values of spot diameter α=1.0, 0.5, and 0.25 mm (from FIG. 20) that correspond to frequencies 250, 500, and 750 GHz, respectively. Based on this analysis, for the disclosed examples, δx=0.2, 0.3, 0.4, 0.5 cm is selected for different studies so as to bracket the spot size values from FIG. 22 corresponding to Γ values of less than 0.2 cm.

Figure 23:
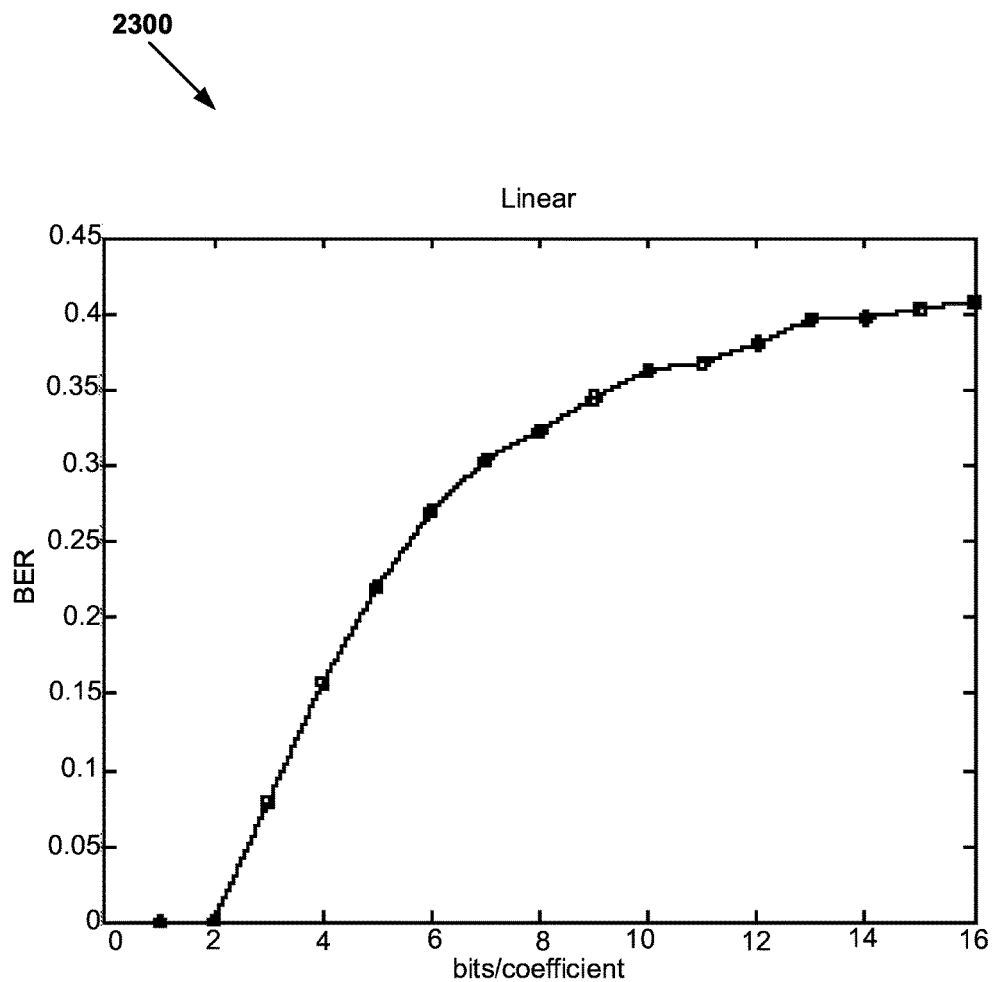
FIG. 23 is a chart illustrating bit error rate versus bits per coefficient, as can be observed in certain examples of the disclosed technology.
Figure 24:
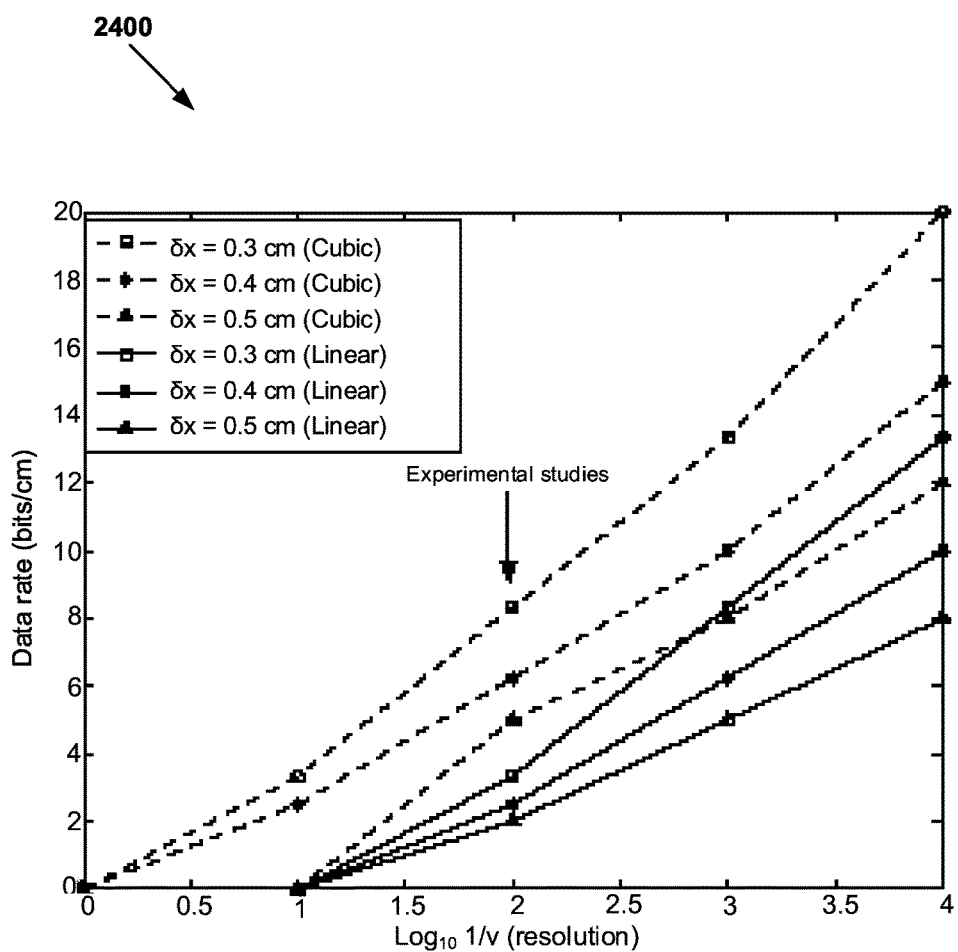
FIG. 24 is a chart illustrating a maximum data rate observed in certain disclosed embodiments.

To select N, the relation in Eqn. 7 can be used to provide the maximum value for v. In this equation, $|Y_{N-1}-d|$ has an order of magnitude of $10^{\lfloor log_{10}|Y_{N-1}|\rfloor}$. Experimentally we find that for values of N>4, $|Y_{N-1}-d|$ is smaller than v and therefore select N=4. Finally, to select the number of bits to encode per coefficient it is assumed that it is desirable to have a zero bit error rate. Using N=4, v=0.01 cm, δx=0.5 cm the BER is plotted versus different numbers of bits/coefficient in the chart 2300 of FIG. 23. As shown, if three or more bits per coefficient are encoded, a non-zero BER is produced. Therefore 2 bits are encoded in $Y_{N-1}$ in the illustrated experiments. We also note that using Eqn. 6 provides b=2 bits/coefficient for the linear case. Finally, these parameters can be used to obtain the maximum achievable data rate for the linear and cubic case using Eqn. 8. The results are shown in the chart 2400 of FIG. 24. For the cubic surface, a data rate of up to 8 bits/cm can theoretically be achieved, while for the linear surface example, a data rate of up to 3.33 bits/cm can theoretically be achieved.

Example Measurement Studies

Figure 25:
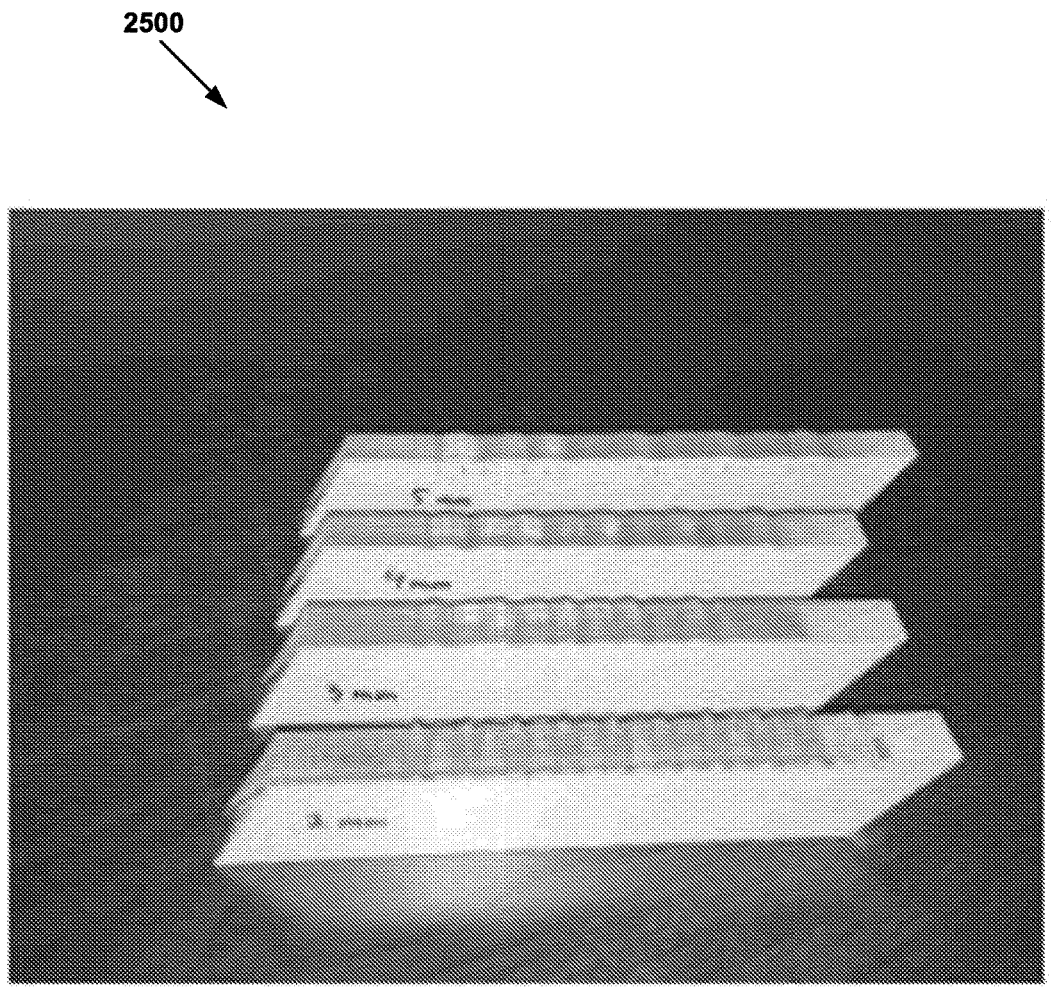
FIG. 25 is a photograph of four objects having linear surfaces modulated with embedded data, as can be manufactured according to certain examples of the disclosed technology.

Four linear surfaces with N=4, v=0.01 cm, b=2 bits/coefficient are constructed for δx=0.2, 0.3, 0.4, 0.5 cm. The samples are cut using a laser cutter and then read using the ToA of terahertz reflections. In FIG. 25 a photograph 2500 shows samples that were constructed according to the disclosed techniques. FIG. 18 that plots the measured vector v̂, for the sample with δx=0.2 cm. As we discussed earlier, given the larger size of the spot, this value of δx may be too small to be read. An additional three cases are discussed below.

The data values encoded in the three samples are shown in Table 1. Since there are ten bits, five separate symbols are created, where each symbol is a N=4 point DCT with the two bits encoded in the last coefficient. The table shows the length of the coded modulated surface as well and as we can see, the 0.3 cm sample achieves the highest data rate of 10/5.7=1.75 bits/cm. The last column in the table gives the maximum data rate obtained for this choice of parameters using Eqn. 8.

TABLE 1

| Sample | Bit Sequence | Length (Data Rate) | Data Rate Max |
|---|---|---|---|
| 0.3 cm | 11 11 10 11 10 | 5.6 cm (1.75 b/cm) | 3.33 b/cm |
| 0.4 cm | 10 10 10 10 10 | 7.6 cm (1.31 b/cm) | 2.5 b/cm |
| 0.5 cm | 10 01 01 11 10 | 9.5 cm (1.05 b/cm) | 2 b/cm |

Figure 27:
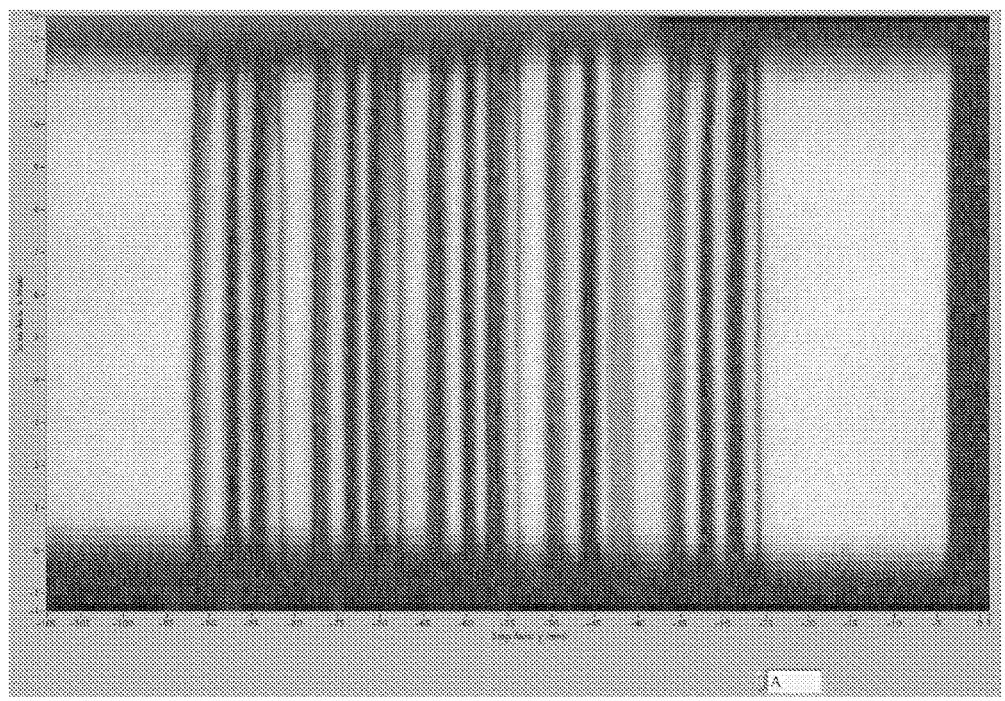
FIG. 27 is a chart illustrating raw time of arrival data for a sample, as can be observed in certain examples of the disclosed technology.

Consider the 0.3 cm case in further detail. The raw image of the sample as read by the terahertz system is shown in the chart 2700 of FIG. 27. The brightness of the pixels corresponds to the received signal intensity. As shown, the strongest reflections are from the peaks while the weakest signals are received from the valleys and the oblique surfaces. In this example, there are about 60 individual scans of the surface (each horizontal row in the image is a separate scan) so there is a relatively large amount of data than can be used to account for surface error or reading error.

Figure 26:
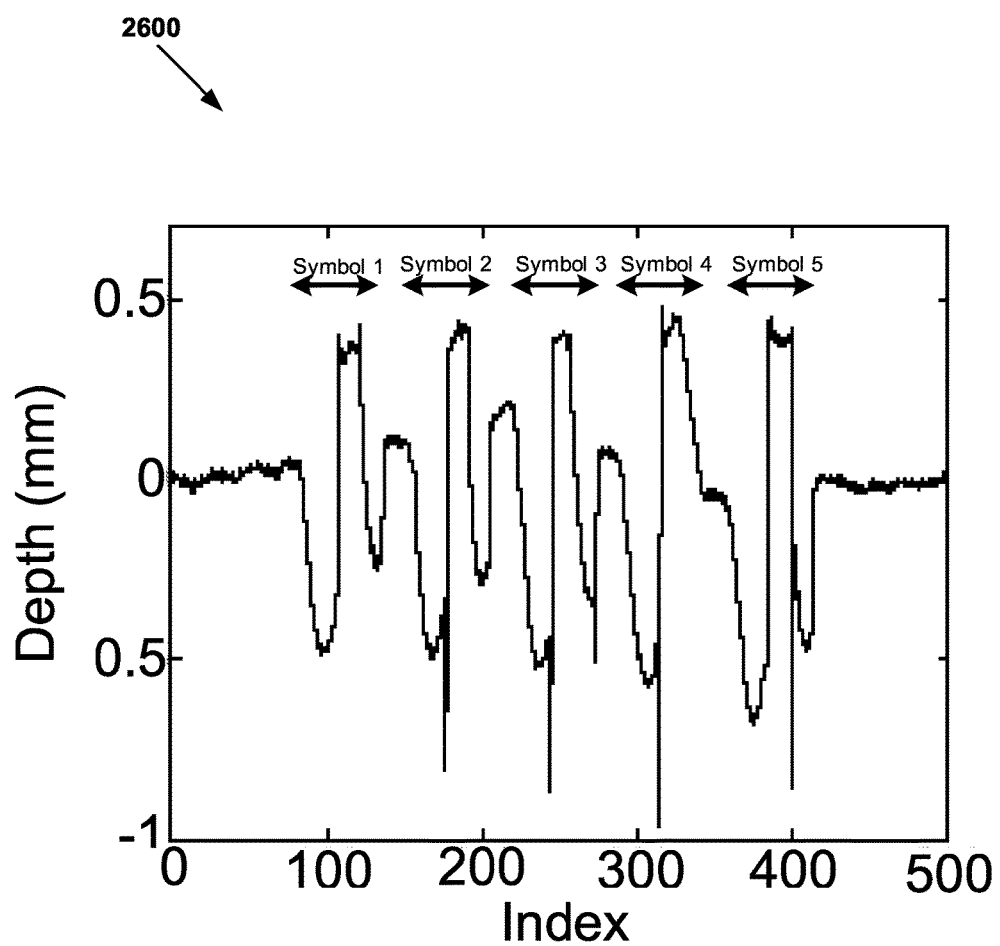
FIG. 26 illustrates time of arrival values computed by averaging a signal across a number of scans, as can be observed in certain examples of the disclosed technology.
Figure 28:
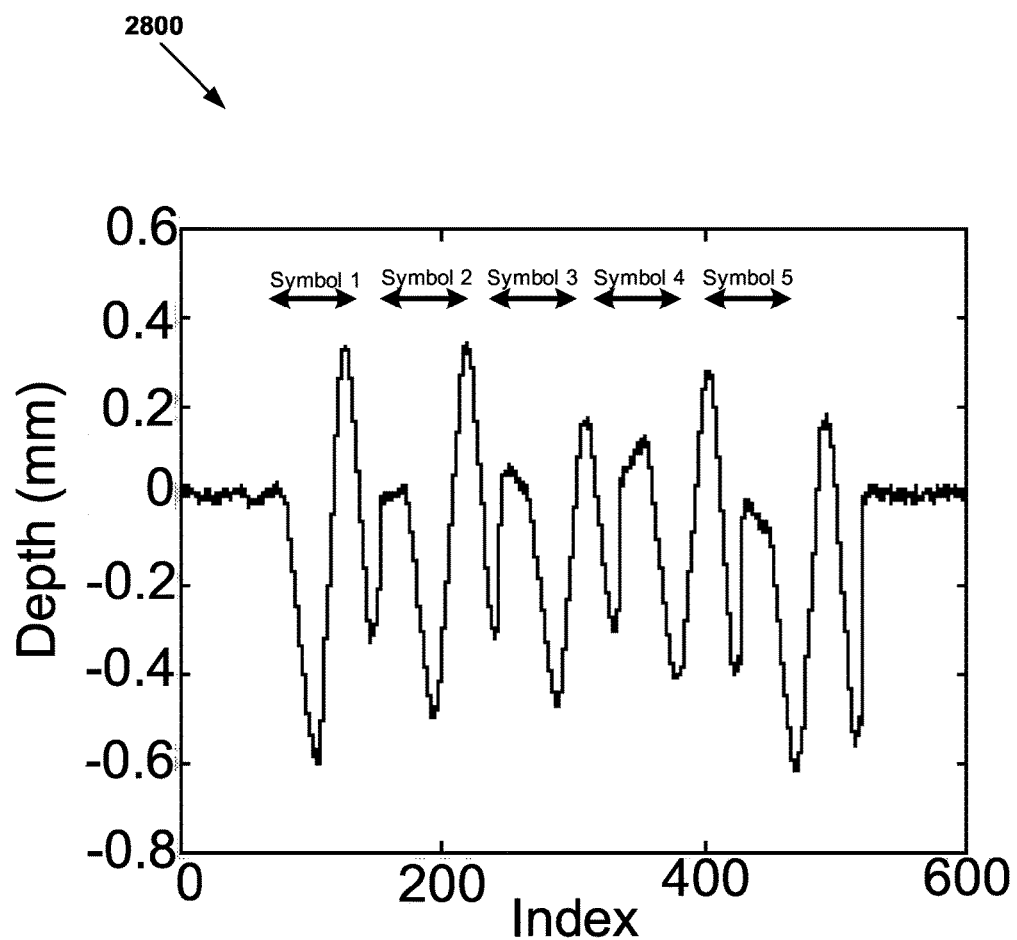
FIG. 28 is a chart that illustrates a sample reconstructed using time of arrival data, as can be observed in certain examples of the disclosed technology.

FIG. 26 is a chart 2600 that illustrates the ToA values computed on the average signal across all 60 scans. Despite this averaging, we do see some errors corresponding to the deep lines that go to depths of almost −1 mm. The reason for this is that the value of δx=0.3 cm is still possibly smaller or very close to the spot size of the reader and thus we see spurious reflections that take a long path to the reader. To illustrate this point, consider the reconstructed surface for the δx=0.4 cm case in the chart 2800 of FIG. 28. Here, there are no errors of this type observed.

Figure 29:
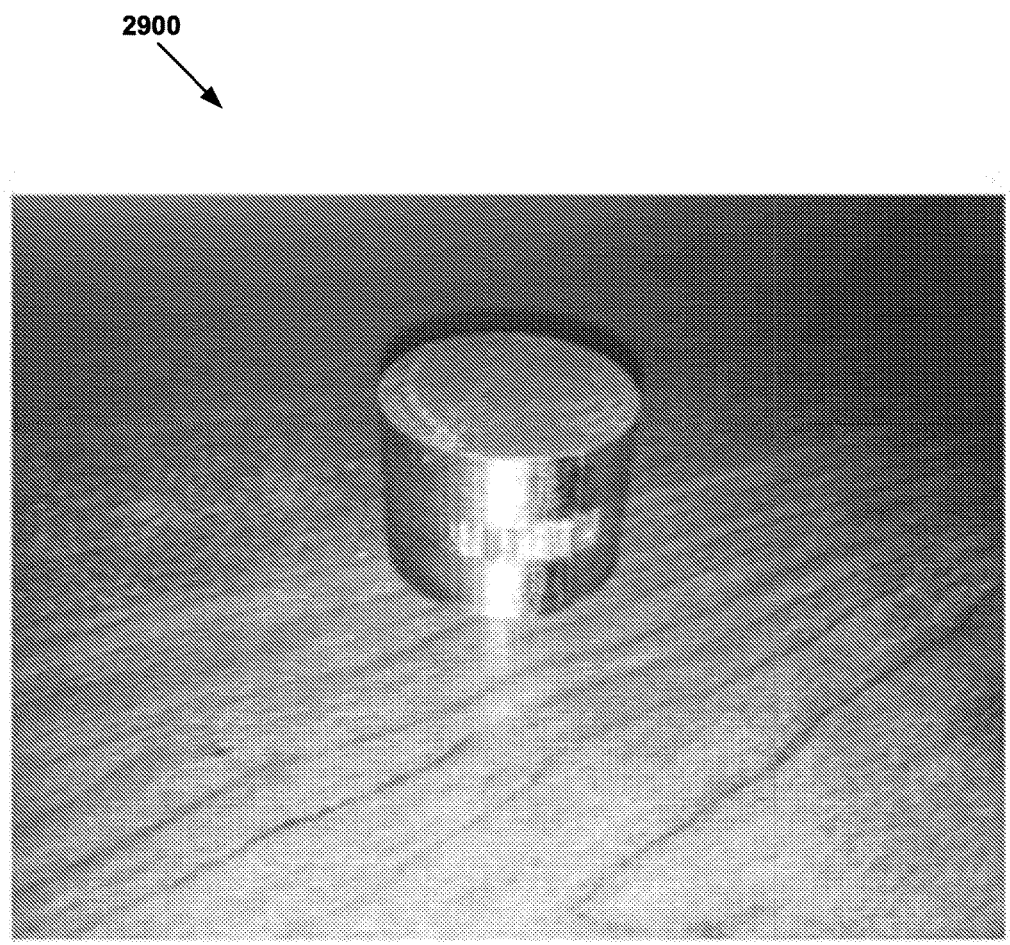
FIG. 29 is a photograph of a cylinder having information embedded on a strip of its surface, as can be manufactured according to certain examples of the disclosed technology.

In addition to the detailed measurement studies above, we also constructed a cylindrical object with embedded data using 3-D printing techniques shown in the photograph 2900 of FIG. 29. This example illustrates the capability to perform surface modulation on curved objects as well. A cylinder of radius 1.5 cm was employed. The other parameters are: N=8 coefficients, δx=0.5 cm, resolution v=0.01 cm. The data 01010000 is embedded in the last coefficient of one 8-point DCT. In order to read this object, one ToA value is read, the object is rotated, and the process is repeated again (e.g., to improve upon limitations of the reader). However, an interesting observation is that in some examples, the resolution of the printer itself limits the smallest printable deformation. The printer used in this example has a resolution of 0.17 mm. This means that the resolution is bounded by the printer characteristics even if we were able to use high resolution readers to get the information.

Example Method of Fabricating Object Surface with Embedded Information

Figure 30:
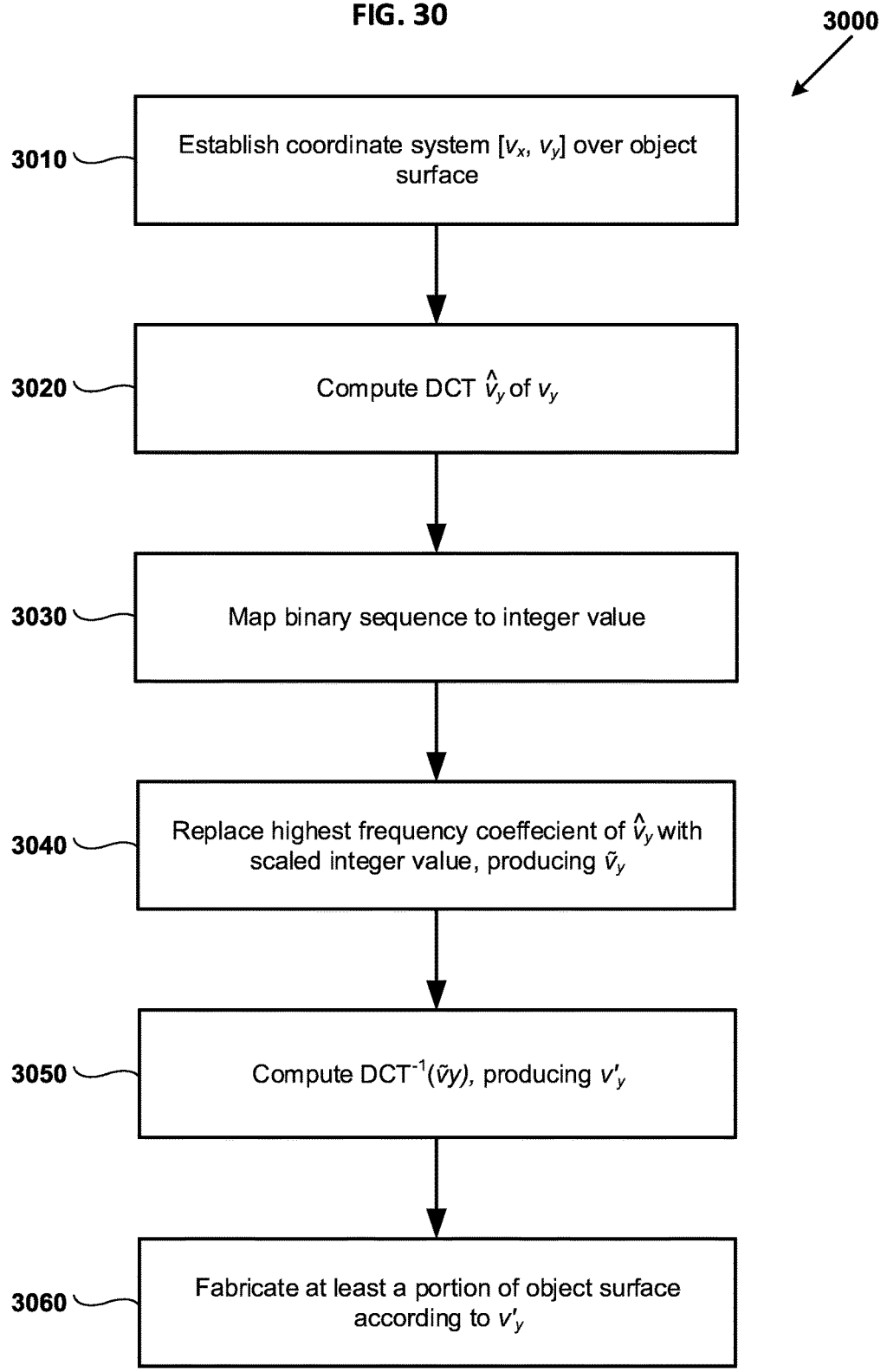
FIG. 30 is a flowchart outlining an example method of fabricating at least a portion of an object surface, as can be observed in certain examples of the disclosed technology.

FIG. 30 is a flowchart 3000 outlining an example method of fabricating at least a portion of an object surface with embedded information, as can be performed in certain examples of the disclosed technology.

At process block 3010, a coordinate system $[v_x, v_y]$ is established over at least a portion of a surface of an object in which data is to be encoded. For example, for a cylinder having a surface that can be described according to the equation $y^2=100-x^2$, a coordinate system according to the described equation can be established. The spacing of discrete points within the coordinate system can be determined based at least in part on information density, noise immunity, damage or wear, and/or other constraints, based on the anticipated environment in which the object will be subjected. In other examples, the coordinate system can be established according to a database of x-y coordinates. In some examples of the disclosed technology, the coordinate system is established based at least in part on measuring a surface of an existing object. Once the coordinate system is established, the method proceeds to process block 3020.

At process block 3020, a transform is computed based on the vector $v_y$ in the coordinate system established at process block 3010, to produce a vector $\hat{v}_y$. In some examples, a discrete cosine transform is applied, in other examples, a discrete wavelet transform is applied, while in other examples, other transforms suitable for embedding data on the surface of an object according to the disclosed technology are employed. After computing the transform, the method proceeds to process block 3030.

At process block 3030, a binary sequence is mapped to an integer value. For example, binary data 10110010 can be mapped to the value "178" using a standard conversion from base 2 to base 10. In other examples, Gray codes or other mappings (e.g., parity bits, error correcting bits, and/or or block codes) can also be used to map the sequence to an integer value. After mapping the binary sequence, the method proceeds to process block 3040.

At process block 3040, the highest frequency co-efficient of the vector $\hat{v}_y$, the vector computed according to the transform and process block 120, is replaced with the scaled integer value generated at process block 3030, in order to produce a vector $\tilde{v}_y$. After generating the vector $\tilde{v}_y$, the method proceeds to process block 3050.

At process block 3050, an inverse of the transform used to process block 3020 is applied to the vector $\tilde{v}_y$, thereby producing another vector $v'_y$. For example, if a discrete cosine transform was used at process block 3020, an inverse discrete cosine transform is applied to generate the vector $v'_y$. After producing vector $v'_y$, the method proceeds to process block 3060.

At process block 3060, at least a portion of an object surface is fabricated according to the values encoded in the vector $v'_y$. In other words, the values in the vector $v'_y$ are used to modulate the surface of the object thereby encoding the data. In some examples, a laser is used to fabricate the portion of the object surface. In some examples, a mold, such as a plastic injection or metal mold, has a number of transducers attached that can be used to impart deformations in the surface of the object. For example, the transducers can induce vibration, or changes in temperature, that will be reflected in properties of the resulting surface of the object manufactured using the mold. As will be readily understood to one of ordinary skill in the relevant art, other methods of fabricating the surface can be employed. Thus, the example method of FIG. 30 can be used to encode a binary sequence of data into the surface of the object itself.

Example Method of Decoding Data Encoded on an Object Surface

Figure 31:
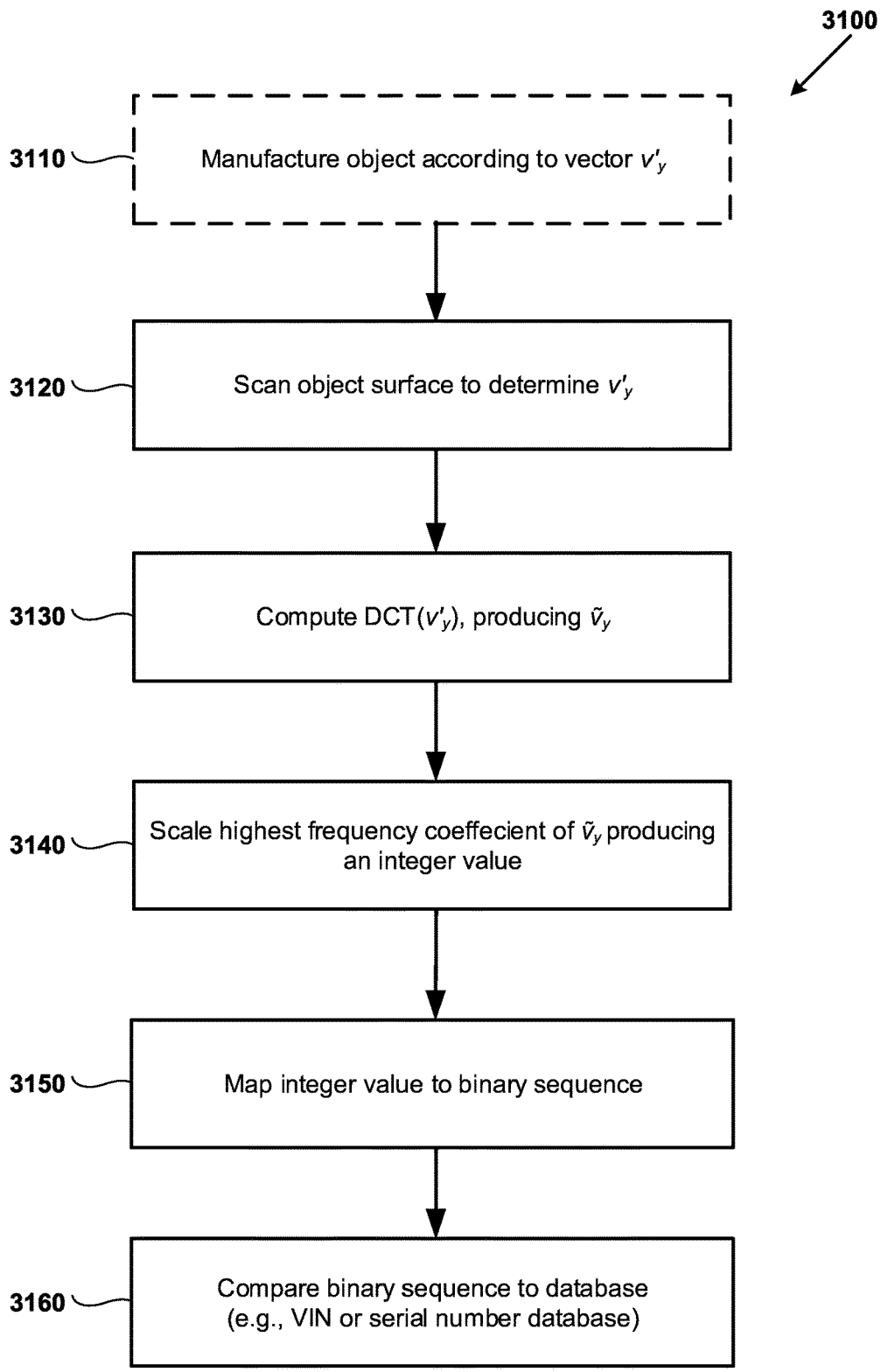
FIG. 31 is a flowchart outlining an example of scanning an object and determining embedded data, as can be observed in certain examples of the disclosed technology.

FIG. 31 is a flowchart 3100 that outlines an example method of decoding data that has been encoded on an object surface as can be performed in certain examples of the disclosed technology.

At process block 3110, an object having an object surface is manufactured according to a vector $v'_y$. For example, the method outlined in the flowchart 3000 above can be used to manufacture such an object. Once an object has been manufactured, the method proceeds to process block 3120.

It should be noted, however, that in some examples of the illustrated method, the acts described herein at process block 3110 are not performed. Thus, the surface of the object is not fabricated according to a vector. For example, certain objects may have varying surfaces that can be used to generate a signature for uniquely identifying the object. In particular, rare or unique objects (e.g., paintings, sculpture, artifacts, etc.) tend to have at least slightly irregular surfaces (e.g., height variations in the surface) that can be used to generate signatures to identify the object and/or to distinguish non-identical copies of the object (e.g., counterfeit paintings, sculptures, artifacts, etc.) using the signature. Thus, such signatures, even though not intentionally encoded upon the surface of the subject object, can be used to authenticate or certify an object to a previously-generated signature for the object.

At process block 3120, at least a portion of an object surface is scanned to determine values for the vector $v'_y$. For example, a laser scanner or a terahertz scanner can be used to scan the surface of object to determine the vector. As noted above, in some examples the object surface is not actively manufactured to include a vector. In such cases, naturally-occurring variations occurring in the surface of an object (e.g., due to variations in the manufacturing process) are measured to determine the vector $v'_y$. Thus, instead of reading the predetermined vector that is being encoded in an object surface, the variations in the object surface themselves are used to determine a series of measurements that will establish a signature that can be used to uniquely identify an object (an example situation where the acts performed at process block 3110 can be omitted). Once the vector $v'_y$ is determined, the method proceeds to process block 3130.

At process block 3130, a transform is computed for the $v'_y$, thereby producing a vector $\hat{v}_y$. For example, a discrete cosine transform or a discrete wavelet transform can be applied in order to produce $\hat{v}_y$, as discussed in further detail above. Once the transform has been computed, the method proceeds to process block 3140.

At process block 3140, one or more frequency coefficients (e.g., the highest frequency coefficient) of the vector $\hat{v}_y$ is determined and scaled in order to produce an integer value. Once the integer value has been determined, the method proceeds to process block 3150.

At process block 3150, the integer value is mapped to a binary sequence. In some examples, the mapping constitutes converting from a base 10 value to a base 2 value, while in other examples certain codings, such as Gray codes, can be used. After mapping the integer value to a binary sequence, the method proceeds to process block 3160. In some examples, the binary sequence is stored in a database for later use in identifying the object.

At process block 3160, the binary sequence determined at process block 3150 is compared to a database storing previously stored values. For example, a database of VINs or other serial numbers can be used to compare the binary sequence. In other examples, the binary sequence determined at process block 3150 is stored in the database and can be used in further iterations of the method depicted in FIG. 31 in order to uniquely identify an object.

Example Computing Environment

Figure 32:
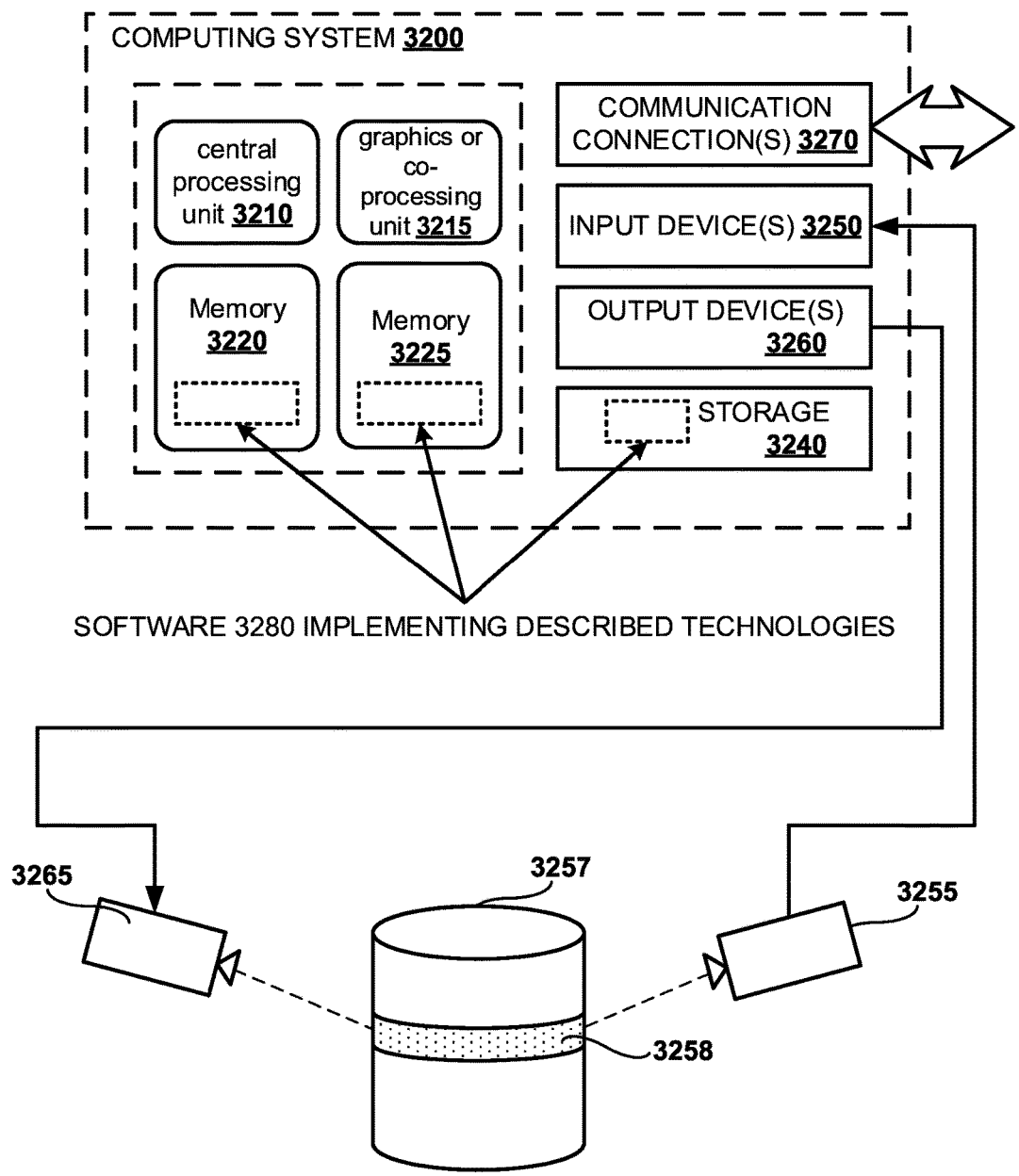
FIG. 32 illustrates an example computing system in which certain examples of the disclosed technology can be implemented.

FIG. 32 depicts a generalized example of a suitable computing system 3200 in which the described innovations may be implemented. For example, the computing system 3200 can be used to perform the method described above regarding FIGS. 30 and 31. The computing system 3200 is not intended to suggest any limitation as to scope of use or functionality, as the innovations may be implemented in diverse general-purpose or special-purpose computing systems.

With reference to FIG. 32, the computing system 3200 includes one or more processing units 3210, 3215, and memory 3220, 3225. In FIG. 32, this basic configuration 3230 is included within a dashed line. The processing units 3210, 3215 execute computer-executable instructions, including instructions for implementing direct memory access (DMA) with filtering disclosed herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 32 shows a central processing unit 3210 as well as a graphics processing unit or co-processing unit 3215. The tangible memory 3220, 3225 may be volatile memory (e.g., registers, cache, RAM), non-volatile memory (e.g., ROM, EEPROM, flash memory, etc.), or some combination of the two, accessible by the processing unit(s). The memory 3220, 3225 stores software 3280 implementing one or more innovations described herein, in the form of computer-executable instructions suitable for execution by the processing unit(s).

A computing system may have additional features. For example, the computing system 3200 includes storage 3240, one or more input devices 3250, one or more output devices 3260, and one or more communication connections 3270. An interconnection mechanism (not shown) such as a bus, controller, or network interconnects the components of the computing system 3200. Typically, operating system software (not shown) provides an operating environment for other software executing in the computing system 3200, and coordinates activities of the components of the computing system 3200.

The tangible storage 3240 may be removable or non-removable, and includes magnetic disks, magnetic tapes or cassettes, CD-ROMs, DVDs, or any other medium which can be used to store information and which can be accessed within the computing system 3200. The storage 3240 stores instructions for the software 3280 implementing one or more innovations described herein.

The input device(s) 3250 can include laser scanners or terahertz scanners 3255 situated to scan radiation over the surface of an object 3257 having a portion 3258 of its surface encoded with data according to the disclosed techniques. Other input device(s) that can be used include a touch input device such as a keyboard, mouse, pen, or trackball, a voice input device, a scanning device, or another device that provides input to the computing system 3200. For video encoding, the input device(s) 3250 may be a camera, video card, TV tuner card, or similar device that accepts video input in analog or digital form, or a CD-ROM or CD-RW that reads video samples into the computing system 3200.

The output device(s) 3260 can include any suitable device for encoding information on a surface of an object according to the disclosed technology, including lasers, transducers attached to a plastic or metal mold, or other suitable devices. For example, the illustrated laser 3265 can be used to create deformations on the object 3257 surface embedding data, as discussed further above. Additional output devices 3260 can include be a display, printer, speaker, CD-writer, or another device that provides output from the computing system 3200.

The communication connection(s) 3270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Thus, novel and non-obvious techniques are disclosed for embedding information into surfaces by, for example, computing the discrete cosine transform of the original surface, replacing the high frequency coefficient and then running the inverse transform. The new surface is very similar to the original but it now also contains information. This disclosure presents a detailed analysis of this technique and derives expressions that provide data rate (bits/cm) as well as a measure of surface distortion. In some examples, a method includes embedding information into plastic objects (either cut from a block or formed using 3D printing) and reading it back using a terahertz reader. Reader characteristics can affect the data rate as well, in particular beam spot size.

In view of the many possible embodiments to which the principles of the disclosed technology may be applied, it should be recognized that the illustrated embodiments are only preferred examples and should not be taken as limiting the scope of the claims. Rather, the scope of the invention is defined by the following claims. We therefore claim as our invention all that comes within the scope of these claims.

We claim:

1. A method of embedding data expressed as a binary sequence onto an object surface, the method comprising:
   establishing a coordinate system over an object surface;
   computing a discrete transform of the coordinate system to a frequency domain;
   mapping the binary sequence to an integer value;
   replacing one or more frequency coefficients of the discrete transform with the integer value;
   computing an inverse of the transform, producing a vector expressed in the coordinate system; and
   fabricating at least a portion of the object surface according to the vector.

2. The method of claim 1, wherein the coordinate system is a one-dimensional or a two-dimensional coordinate system.

3. The method of claim 1, wherein the one or more frequency coefficients is the highest frequency coefficient of the transform.

4. The method of claim 1, wherein the discrete transform is a discrete cosine transform or discrete wavelet transform.

5. The method of claim 1, wherein the discrete transform is a discrete sine transform, a discrete Hartley transform, a Chirplet transform, a Hankel transform, a Chebyshev transform, or a Hadamard transform.

6. The method of claim 1, wherein the fabricating comprises using a 3-D printer, a laser etcher, or an array of transducers connected to a mold.

7. The method of claim 1, wherein the vector is a one-dimensional or a two-dimensional vector.

8. An article of manufacture that is manufactured by performing the method of claim 1, wherein the article is a vehicle component, integrated circuit, integrated circuit package, a firearm, or another manufactured object.

9. A method of decoding data stored on an object having an object surface, the method comprising:
scanning a surface of the object to determine a vector of surface measurements;
computing a discrete transform of the vector, producing a series of coefficients;
scaling one or more frequency coefficients of the series of coefficients to produce an integer value; and
mapping the integer value to a binary sequence.

10. The method of claim 9, further comprising comparing the binary sequence to a database to identify the object.

11. The method of claim 9, wherein the one or more frequency coefficients is the highest frequency coefficient of the series of coefficients.

12. The method of claim 9, further comprising, prior to the scanning, manufacturing the object surface according to the vector.

13. The method of claim 9, wherein the discrete transform is a discrete cosine transform or a discrete wavelet transform.

14. The method of claim 9, wherein the scanning is performed using a laser or terahertz scanner.

15. The method of claim 9, further comprising searching for the binary sequence in a database and based on the searching, identifying the object.

16. The method of claim 9, further comprising:
prior to the scanning:
establishing a coordinate system over the surface of the object;
computing a discrete transform of the coordinate system to a frequency domain;
mapping the binary sequence to an integer value;
replacing one or more frequency coefficients of the discrete transform with the integer value;
computing an inverse of the discrete transform, producing an encoding vector expressed in the coordinate system; and
fabricating at least a portion of the object surface according to the encoding vector.

17. The method of claim 9, wherein the surface of the object is not fabricated according to a vector.

18. The method of claim 17, wherein the surface of the object has height variations that can be used to generate a unique binary sequence for use as a signature identifying the object.

19. One or more computer-readable storage media storing computer-readable instructions that when executed by a computer, cause the computer to perform the method of claim 9.

20. An apparatus, comprising:
a processor;
memory;
a scanning device coupled to the processor, the scanning device operable to generate a vector of data by measuring the surface of an object; and
one or more computer-readable storage media storing computer-readable instructions that when executed by a computer, cause the computer to perform the method of claim 9.

21. An article of manufacture, comprising:
an object having a surface, the object surface being encoded with by varying the height and/or depth of the object surface according to a method, the method comprising:
establishing a coordinate system over an object surface;
computing a discrete transform of the coordinate system to a frequency domain;
mapping a binary sequence to one or more encoding values;
replacing one or more frequency coefficients of the discrete transform with the encoding values;
computing an inverse of the discrete transform, producing a vector expressed in the coordinate system; and
fabricating at least a portion of the object surface according to the vector.

22. The article of manufacture of claim 21, wherein the fabricating the object surface uses a laser, a transducer in communication with the object surface, or a 3-D printer.

23. The article of manufacture of claim 21, wherein the method further comprises:
selecting a number of coefficient values N to use for the transform based on an amount of distortion induced in the transform relative to the wavelength of a reader to be used to read data embedded in the object surface according to the vector.

24. The article of manufacture of claim 21, wherein the method further comprises:
selecting spacing of discrete points within the coordinate system based at least in part on one or more of the following: a database of x-y coordinates, information density, noise immunity, damage, or wear, in an anticipated environment in which the object will be subjected.

* * * * *